(12) United States Patent
Huang

(10) Patent No.: US 12,008,394 B2
(45) Date of Patent: *Jun. 11, 2024

(54) BLOCKCHAIN SHARDING WITH PARALLEL THREADS

(71) Applicant: EZBLOCK LTD., Grand Cayman (KY)

(72) Inventor: Rundong Huang, Saratoga, CA (US)

(73) Assignee: EZBLOCK LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,157

(22) Filed: Feb. 21, 2023

(65) Prior Publication Data

US 2023/0205573 A1  Jun. 29, 2023

Related U.S. Application Data

(63) Continuation of application No. 16/516,716, filed on Jul. 19, 2019, now Pat. No. 11,620,152.

(60) Provisional application No. 62/701,414, filed on Jul. 20, 2018.

(51) Int. Cl.
*G06F 9/46* (2006.01)
*G06F 16/23* (2019.01)

(52) U.S. Cl.
CPC .......... *G06F 9/466* (2013.01); *G06F 16/2379* (2019.01)

(58) Field of Classification Search
CPC .............................. G06F 9/466; G06F 16/2379
USPC ....................................................... 718/101
See application file for complete search history.

(56) References Cited

U.S. PATENT DOCUMENTS

| 10,262,140 B2 | 4/2019 | Smith et al. |
| 10,397,328 B2 | 8/2019 | Bohli et al. |
| 10,740,733 B2 | 8/2020 | Moir et al. |
| 11,620,152 B2 * | 4/2023 | Huang ............... G06F 9/466 718/101 |
| 2016/0179865 A1 | 6/2016 | Bortnikov et al. |
| 2019/0123892 A1 | 4/2019 | Basu |
| 2019/0199515 A1 | 6/2019 | Carver et al. |
| 2020/0026548 A1 * | 1/2020 | Huang ............... G06F 9/466 |
| 2020/0045019 A1 | 2/2020 | Huang |

FOREIGN PATENT DOCUMENTS

| WO | WO-2017109140 A1 | 6/2017 |
| WO | WO-2018217804 A1 | 11/2018 |
| WO | WO-2020018898 A1 | 1/2020 |

OTHER PUBLICATIONS

U.S. Appl. No. 62/701,414, filed Jul. 20, 2018, Scaling a Blockchain By Decentkalized-App-Based Sharding/Virtual Chain With Parallel Threads in a Node.

(Continued)

*Primary Examiner* — Bradley A Teets
(74) *Attorney, Agent, or Firm* — Schwegman Lundberg & Woessner, P.A.

(57) ABSTRACT

A method comprises receiving from a distributed app (dApp), a shard creation transaction in a blockchain block of a blockchain, the block comprising multiple shards; collecting, with a join block in the blockchain, transactions, the join block adjacent the blockchain block; encapsulating the shard creation transaction; applying the block including the shard creation transaction to yield a new shard in the block; and broadcasting the block.

27 Claims, 22 Drawing Sheets

(56) References Cited

OTHER PUBLICATIONS

U.S. Appl. No. 16/516,716, filed Jul. 19, 2019, Blockchain Sharding With Farallel Threads.
"U.S. Appl. No. 16/516,716, Non Final Office Action dated Mar. 1, 2022", 44 pgs.
"U.S. Appl. No. 16/516,716, Notice of Allowance dated Nov. 25, 2022", 20 pgs.
"U.S. Appl. No. 16/516,716, Response filed Aug. 30, 2022 to Non Final Office Action dated Mar. 1, 2022", 15 pgs.
"Central processing unit", Wikipedia, (Jul. 17, 2017).
"International Application Serial No. PCT/US2019/042587, International Search Report dated Oct. 31, 2019", 2 pgs.
"International Application Serial No. PCT/US2019/042587, Written Opinion dated Oct. 31, 2019", 4 pgs.
Li, Wenting, et al., "Towards Scalable and Private Industrial Blockchains", BCC'17, Proceedings of the ACM Workshop on Blockchain, Cryptocurrencies and Contract, [Online] Retrieved from the Internet: <URL: http://dx.doi.Org/10.1145/3055518.3055531>, (Apr. 2, 2017), 6 pgs.
Luu, Loi, et al., "A Secure Sharding Protocol For Open Blockchains", CCS'16, Proceedings of the 2016 ACM SIGSAC Conference on Computer and Communications Security, Vienna, Austria. [Online]. Retrieved from the Internet: <URL: http://dx.doi.org/10.1145/2976749.2978389>, (Oct. 24-28, 2016), 13 pgs.

* cited by examiner

BLOCKCHAIN SHARDING WITH PARALLEL THREADS

CROSS REFERENCE TO RELATED APPLICATIONS

This application is a continuation of and claims the benefit of priority under 35 U.S.C. § 120 to U.S. patent application Ser. No. 16/516,716, filed on Jul. 19, 2019, which application claims the benefit of priority under 35 U.S.C. § 119(e) to U.S. Patent Application Ser. No. 62/701,414, filed on Jul. 20, 2018, which is incorporated by reference herein in its entirety.

TECHNICAL FIELD

An embodiment of the present subject matter relates generally to blockchain and, more specifically, scaling a blockchain via a decentralized app-based sharding with parallel threads.

BACKGROUND

To support massive number of devices and blockchain transactions, a blockchain needs to be highly scalable, high performance, secure, and support very frequent micropayments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
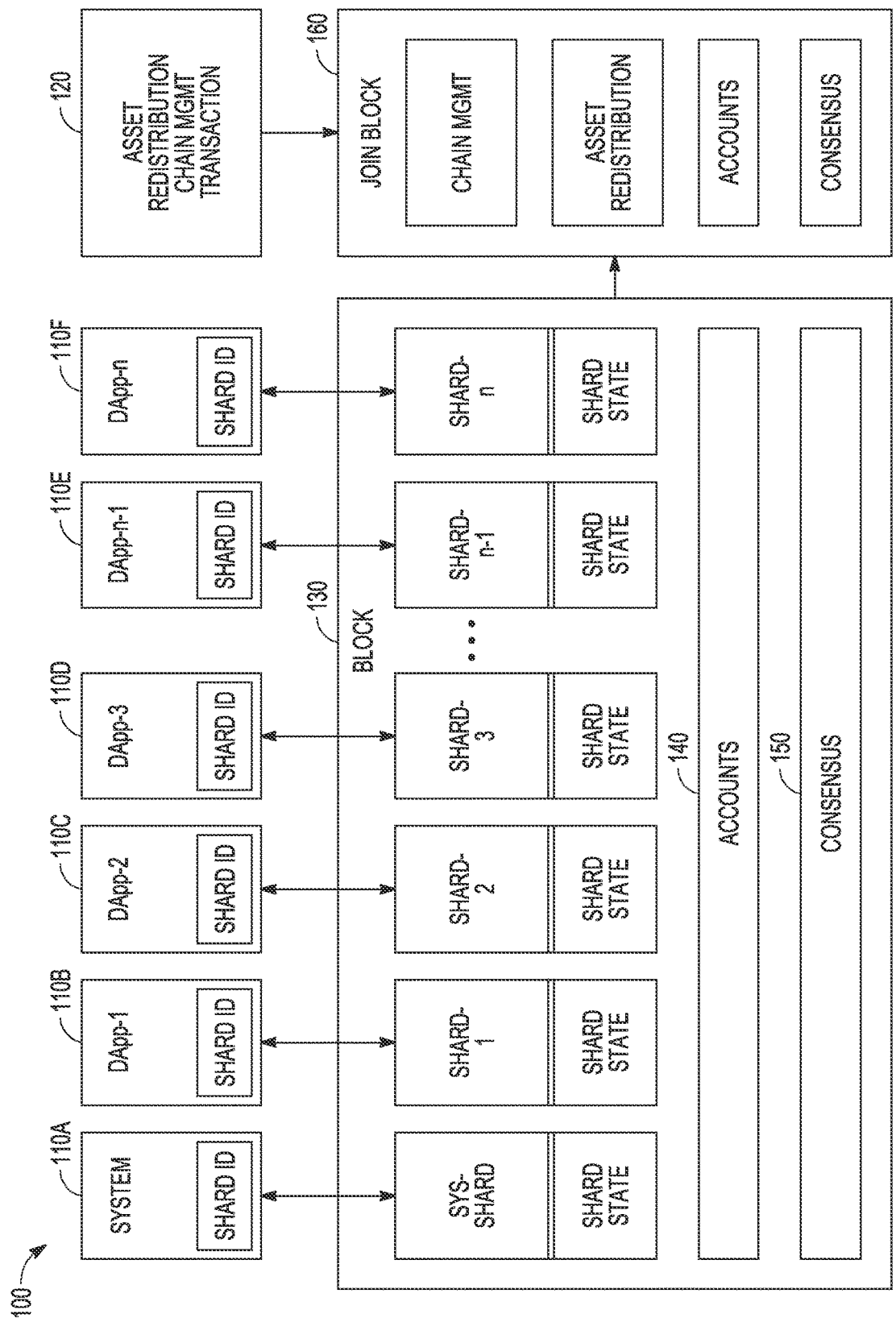
FIG. 1 shows an example system architecture.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for a decentralized Application (dApp) based sharding technology that targets million transaction per second+ (MTPS+) performance by requiring mining/validating nodes to be able to execute the transactions of shards in parallel threads, instead of only dealing with the single shard they are assigned to. Chain clustering technology is designed to handle the growth when performance increases the hardware resource capacity minimal requirements to the point of risking centralization. A single unified account per user and join block is designed to handle the cross shard and cross chain communications deterministically and efficiently. Transaction executions and validations of a shard is scheduled by miners that can leverage cloud computing scheduling technologies. Embodiments also provide a voucher mechanism so that miners are rewarded and incentivized while most of the transactions in the system shards are free for users.

Embodiments provide a single-chain structure, but supports decentralized Application (dApp) based sharding. Because of the independence among the shards aka virtual chains, execution can be parallelized. Transactions within each dApp shard may be between the members of the shard (or virtual chain). Each shard has its own state database. Smart contracts can modify state data within each shard without interacting other shards (virtual chains). Execution can be on a single machine with each shard executing by different threads and/or processors, thereby minimizing the need to transmit the whole chain to other devices, which will save data transmission resources.

There are three types of cross shard communications: cross shard transactions, cross shard read-only smart contracts, and cross shard read-and-write smart contracts. Each is handled differently to achieve the best efficiency.

Join Block enables synchronizing shards. A Join Block is inserted for every fixed number of regular blocks, say 100 blocks. When Join Block is inserted, all threads for the shards stop execution and only the predefined transaction types of Join Block are executed. These transactions are used to coordinate the states of each shard.

Embodiments provide a verification system with three kind of nodes:

Core nodes: including miners and full nodes that provide services, etc., need to verify transactions for all the shards.

DApp nodes: Each dApp node can choose to verify transactions related to dApp in a shard.

End IoT device nodes: The end IoT device only needs to verify whether a relevant transaction is included in a block.

In terms of security, because each shard shares the same consensus algorithm and maintains full synchronization with the blockchain, the security is intact as a single blockchain.

In order to maximize the parallelization of transaction execution, transactions need to be scheduled according to their interdependencies. The scheduling depends on the characteristics of the transaction, such as priority, whether it can be delayed, state dependency et al. The scheduler will select the corresponding system resource to schedule the execution of the shards. For each shard, the transactions, execution states, etc. are completely independent and can be scheduled with cloud computing scheduling tools, such as Kubernates.

Embodiments enable parallelism via multi-threading and efficient cross shard communication via shared process memory space.

Blockchain transactions are grouped into shards according to the dApp these transactions belong to. The transactions for different shards are then executed in parallel by different software threads of the same blockchain node software process.

The software threads share the same memory space of the node software process and hence can access the states of different shards directly. Cross shard communications and transactions become very straightforward and efficient compared to the sharding method involving multiple physical servers running single-threaded.

The software threads are running in different hardware threads and CPU cores of the computer server. This greatly improves the blockchain transaction processing performance that scales linearly by the number of hardware threads utilized.

Embodiments also enable Control achieved by the join block

Blockchain transaction processing performance scale by sharding with multi-threading in a single node needs to be controlled in a carefully designed system.

Join block that works like a block chain clock by fixed number of block intervals helps to achieve the control by executing sharding management, system management and cross chain/shard functions in the join block.

During the join block execution all software threads are joined together to execute the join block transactions.

FIG. 1 shows an example system architecture 100. A block 130 comprises multiples shards coupled to a respective DApp 110. Each DApp 110 (e.g., 110a) includes a Shard ID identifying the shard it is communicatively coupled to). Each shard further contains a shard state. Block 130 further includes an Account 140 and a Consensus 150. Coupled to the block 130 is a Join Block 160 comprising a chain management module, an asset redistribution module, an account module and a consensus module.

dApp-based sharding places highly correlated transactions in a dApp into the same shard to leverage the locality of intra-shard transactions to improve system parallelism and hence the system performance. For example, all transactions relating to power generation can be stored on a shard, power equipment manufacturing on another shard and power grid management on another shard. Cross-shard communication would happen via join blocks—e.g., a transaction from the power grid management shard to increase power generation on the power generation shard or a transaction ordering replacement parts from the power generation shard to the manufacturing shard.

Figure 2:
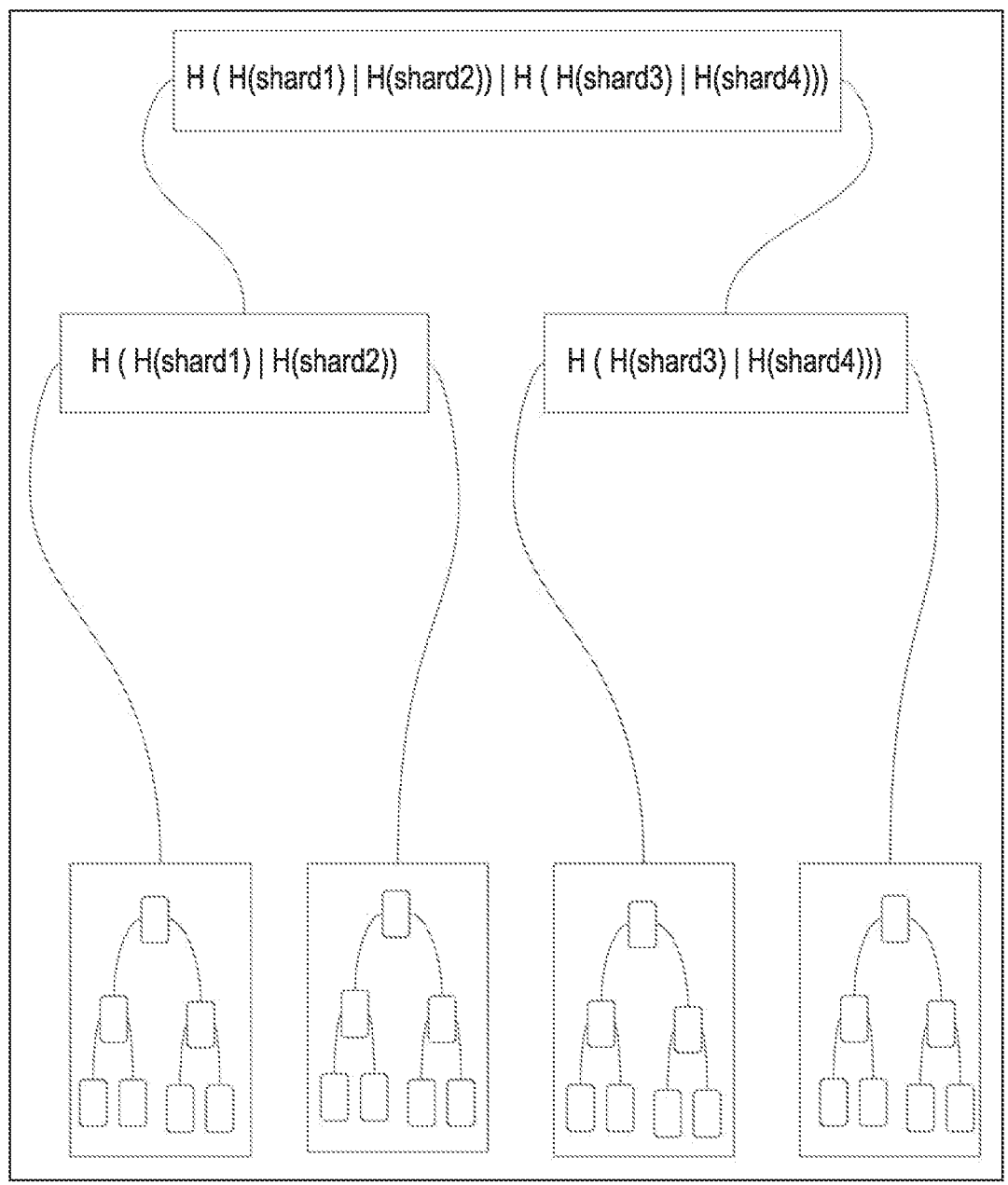
FIG. 2 is a block diagram of a Merkle Tree for shard states.

FIG. 2 shows a shard state Merkle tree for example. The block 130 generates a separate shard each dApp. Each shard has an 8-byte long, readable shard ID. A miner schedules shards based on the shard M. Embodiments encourage dApp developers to put all smart contracts, account states in the same shard. Within the same shard, all transactions can be from or to the shard owner. In other words, the shard is created for the dApp.

Receiver pay: In normal operation, if a transaction does not involve storage usage, the transaction is free. For storage related transactions, users are required to pay a fee. In some applications, this fee can be paid by the recipient, e.g., the cost is absorbed by the service providers.

Shard permission management: Users can define shard permissions to achieve security separation. For security purpose, users should set separate permissions for each shard so that even if the private key is compromised, it will not affect the security of the user's asset in other shards.

Shard operation: Shards can be created, merged, connected, split, or removed et al.

Shard scheduling: Shard can be scheduled by the miners according to their priorities.

Cross shard communication: Embodiments encourages developers to complete transactions within a shard as much as possible, Cross shard transactions are completed in the Join Block 160. In order to limit cross-shard transactions, fees can be required for cross-shard transactions.

dApp-based sharding does not require additional consensus algorithms. All shards are on the same mining/core nodes as the main chain, using the same existing consensus algorithm 150. The consistent consensus algorithm 150 has the following advantages:

The same security for shards as the main chain.

Shard synchronization: In blockchain, the blocks can be referred to as a system synchronization clock. Since all shards are in the same block, cross-shard transactions are more efficient and deterministic compared to having to rely upon asynchronous transactions.

A transaction 120 comprises the following:

From: Account that issued the transaction. Like an email address, the From field uses the @ operation to specify the source shard for cross-shard transactions. For example: test@au.car.

To: The receiving account of the transaction. To also supports @ operation. If the transaction is sent to a Join Block, the To field does not use the @ operation.

Seq: Unlike traditional sequence numbers, sequence numbers are closely related to the To field i.e. the destination shard. Each different shard has an independent sequence number field, and the Join Block has its own separate sequence numbers.

Data: The data carried by the transaction. The Data field has different significance depending on the dApp. This field is omitted for the transfer transactions. For messages, this field carries the message body. In a smart contract call, this field holds the message required for the contract call.

Sig: The signature part of the transaction.

Shards includes system shards and user shards. For example, system shards start with "sys." The owner of the system shards is all the users of the entire system. According to the shard transaction rule, all users in the system shard can perform transactions to each other. In the system shard, user can transfer asset or send messages to another user without a fee. The number of system shards will increase as demand increases, and the community will decide whether to add new system shards.

User shards are created by users on demand and can use any name other than the system shard names. The owner of the user shard creates the shard. Shard owner is required to pay for shard storage usage and the rate is determined by the community as a reward to the miners. Users cannot create dApps within the system shards, and system shards' storage is kept permanently by the chain. System shards are for the benefit of the users e.g. transfer is feeless while user shards are most likely for enterprise users and require fees for shard creation and maintenance.

Figure 3:
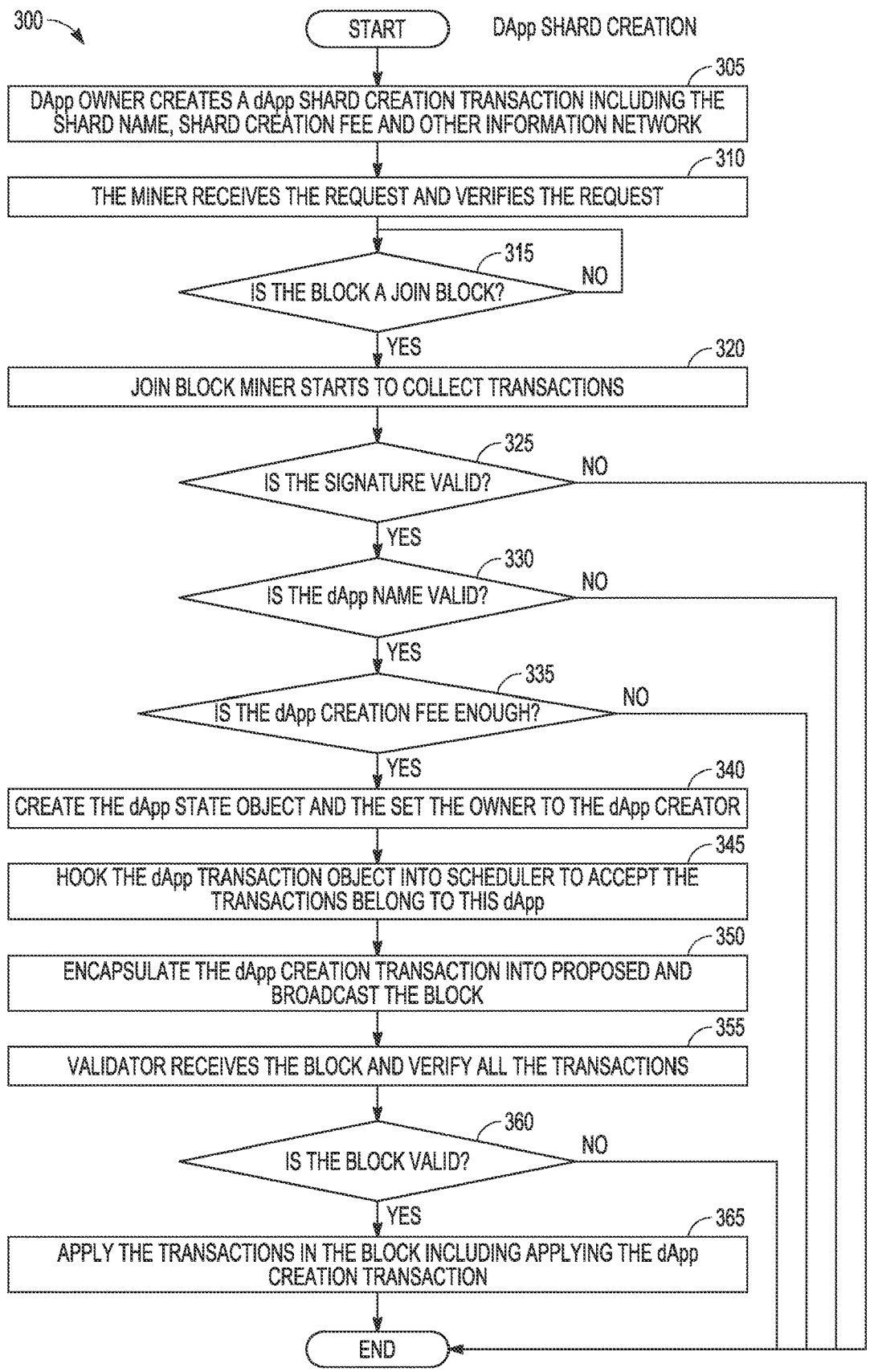
FIG. 3 is a flowchart illustrating a method of creating a shard.
Figure 4A:
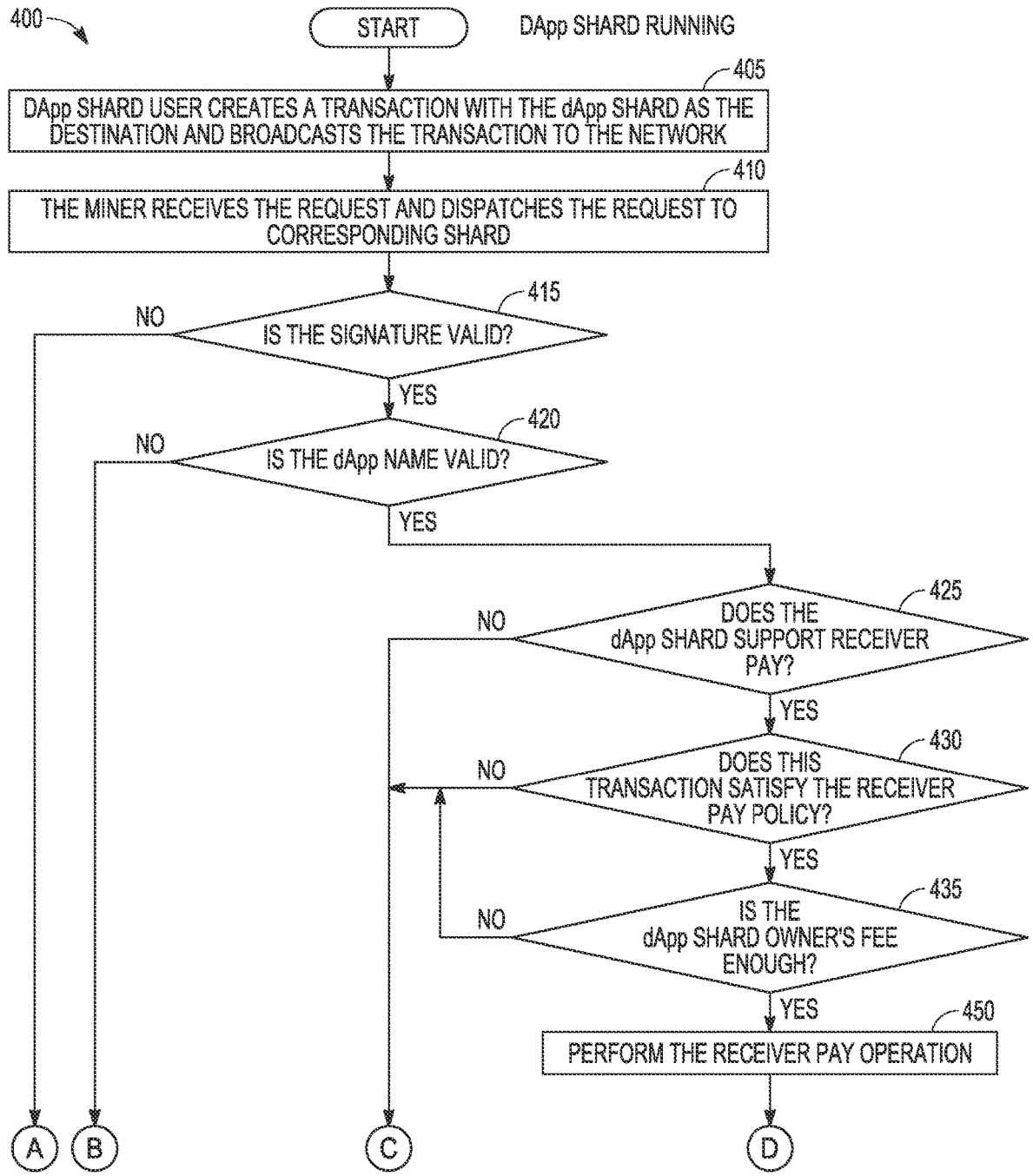
FIGS. 4A and 4B are flow charts illustrating a method of running a shard.
Figure 4B:
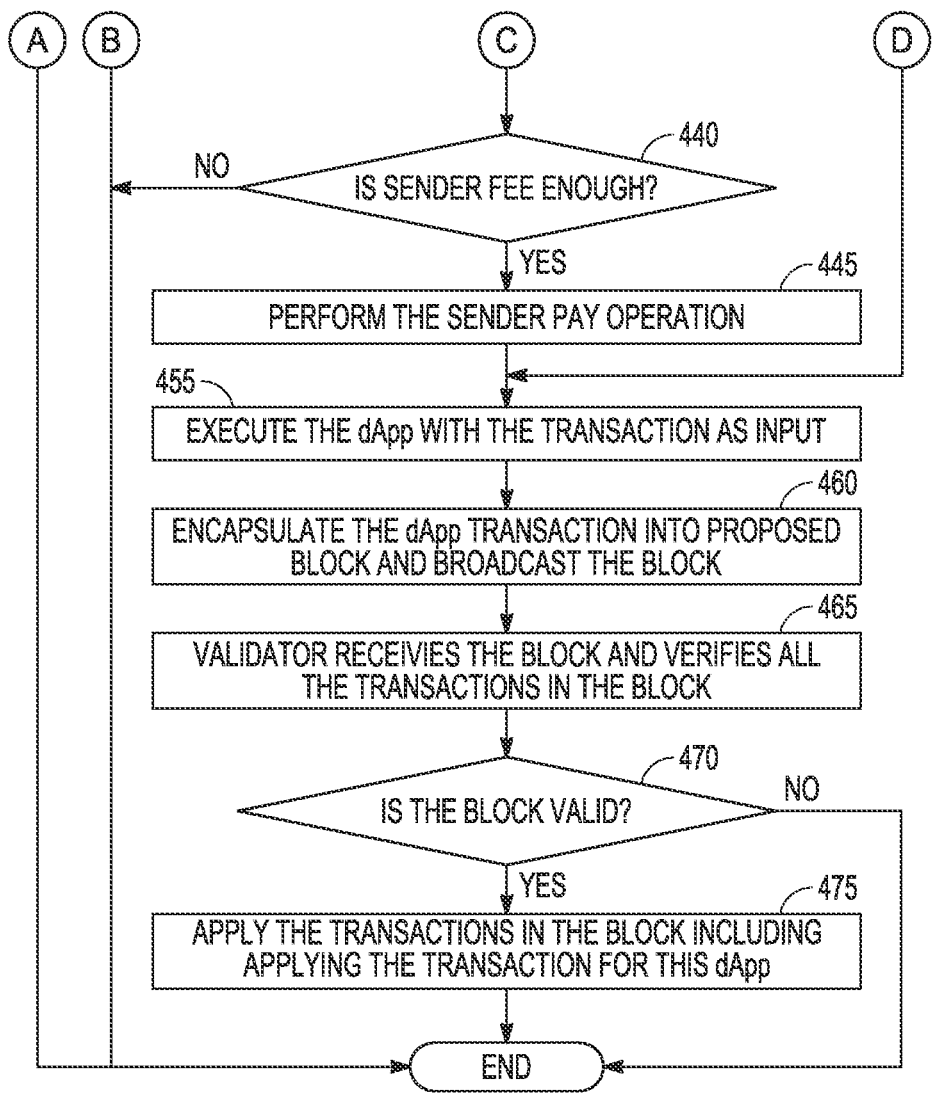
Figure 5A:
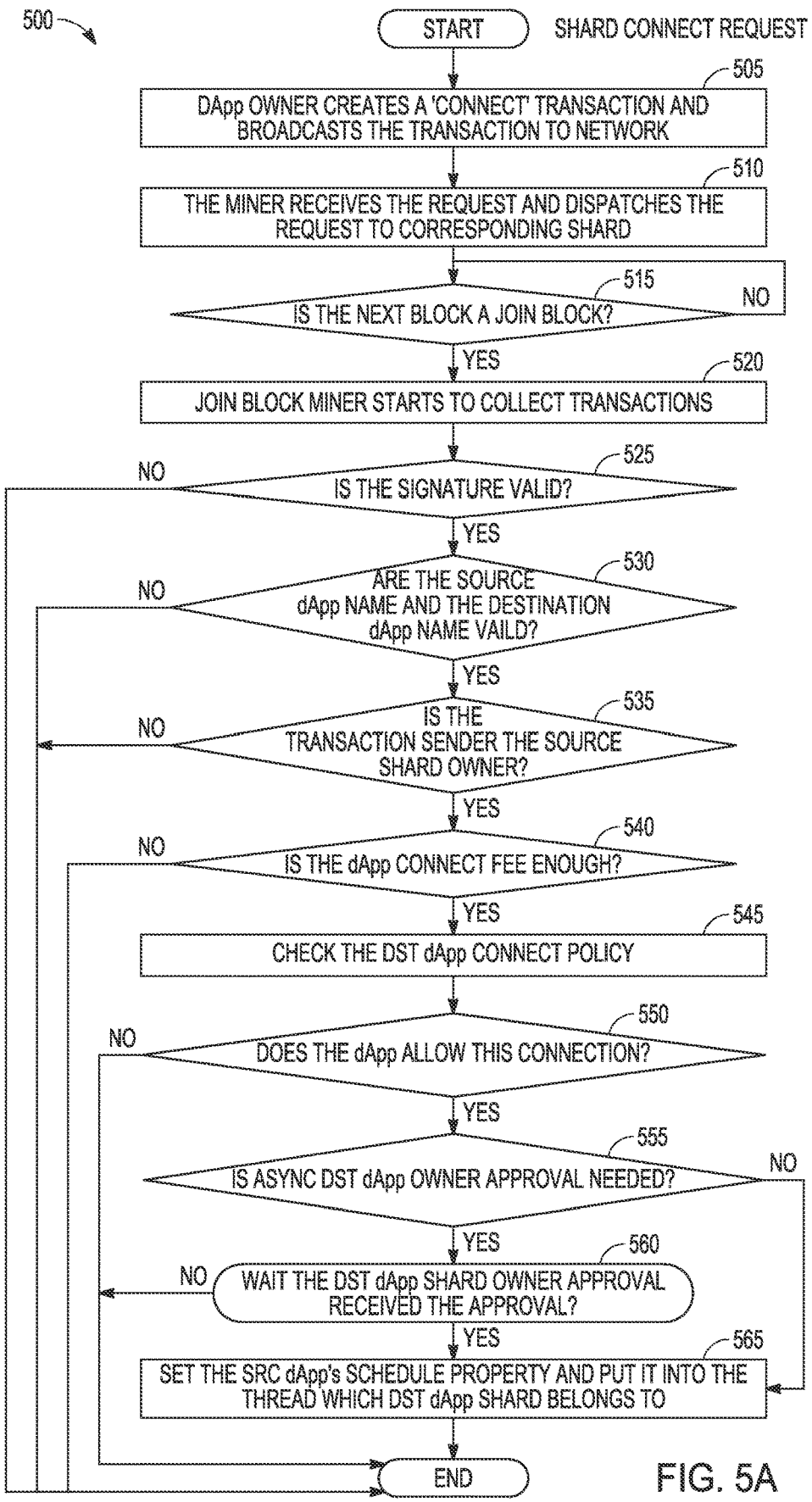
FIGS. 5A and 5B are flow charts illustrating methods of connecting shards and approving connections requests.
Figure 5B:
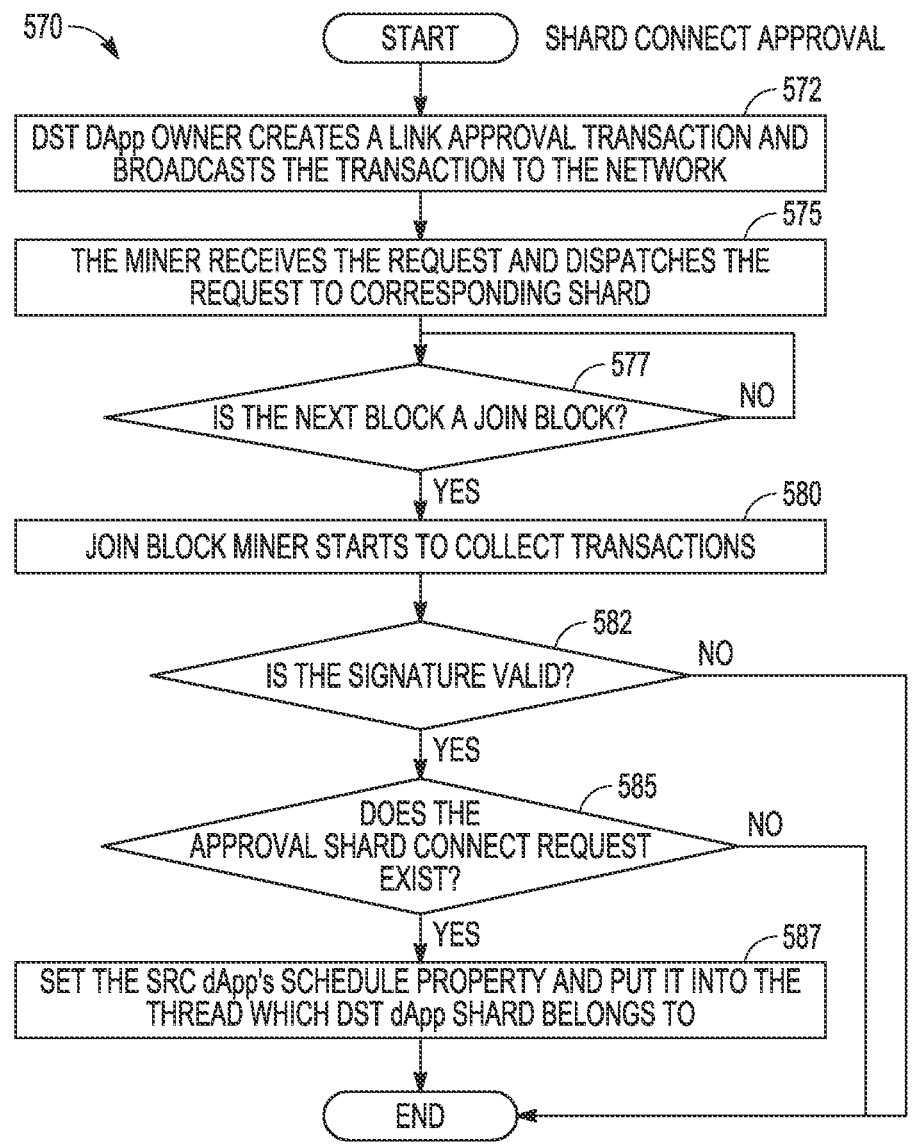

FIGS. 3-5 are flowcharts illustrating shard creation, shard transaction and shard connection and approval. Embodiments support the following operations:

Creating a shard: shard creation is done inside a Join Block, which requires a fee. One can choose meaningful 8-byte length names (e.g., 12 letters of (A-Z)) to create shards. For example, system reserves all names with the prefix of "sys".

Joining a shard: User does not need to explicitly join a shard. User can use this operation to set separate permissions for the shard. Embodiments uses a unified account and user does not need to create a new account within each shard. In order to limit the use of shards, within the same shard, all transactions must be sent by the creator of the shard, or sent to the creator of the shard (optionally, embodiments may exclude sending by or to shard creator peer to peer transactions). Other transactions will not be scheduled by miners.

Exiting a shard: user does not need to explicitly exit a shard. User exits the shard by clearing its balance in a shard to 0 by asset re-allocation in a join block.

Updating a Shard.

Splitting a shard to manage the shard size. If the shard becomes too big (e.g., based on number of transactions/second required—exceeding a predefined single CPU thread performance), it is better to separate the shards base on say regions even for the same dApp or merging them back if the shard becomes less active/small.

Merging Shards.

Connecting shards: Connect two shards that need to communicate across shards. Connecting shards is a way to solve cross-chain smart contract invocations. By connecting two related shards, the transactions between the two connected shards are now serialized.

Disconnecting shards: disconnect two connected shards.

Freezing a shard: in order to reduce the use of disk, miners can choose to freeze under-funded shards. After a shard is frozen, miners will no longer accept any transactions for that shard. After the shard operation fees are replenished, the miner recovers the shard and the shard transactions can continue to execute.

Shard scheduling: Some of the transactions in the shards are feelers. In order to prevent the transaction from being abused, Candy is introduced in the economic model. Candy solves the problem of distribution of rewards among miners. Miners goal is to maximize profit of their mining work. The number of Candies is positively related to the scheduling priority of a shard transaction. In other words, miners use the number of Candies paid by the user in the transaction as the shard scheduling criteria.

In method 300 (FIG. 3), a DApp owner creates (305) a dApp shard creation transaction including shard name, shard creation fee, and other information to a network. A miner receives (310) and verifies the request. If (315) the next block is a join block, then a join block miner starts (320) to collect transactions. If (325, 330, 335) the signature is valid, the dApp name valid and dApp creation fee sufficient then a dApp state object is created (340) and the owner will be the dApp creator. Next, a dApp transaction object is hooked (345) into a scheduler (a shard transaction scheduler for the node/thread) to accept transactions belonging to this dApp. A dApp creation transaction is encapsulated (packaged/packed into a block) (350) into a proposed block and the block is broadcast. That is, the transactions packed in the block are applied to all the nodes and recorded into the block chain including the newly created shard for the dApp. A validator receives (355) the block and verifies all transactions. If (360) the block is valid, the block is applied (365) including the dApp created shard.

In method 400 (FIGS. 4A and 4B), a dApp shard user creates (405) a transaction with a destination of dApp shard and broadcast the transaction to the network. A miner receives the request and dispatches (410) the request to corresponding shard. A sender pay (445) or receiver pay operation (450) is performed if the signature is valid (415) and the dApp name is valid (420) based on receiver pay support (425), policy compliance (430), and if fee is sufficient (435, 440).

Next, the dApp is executed with the transaction as input (455). The dApp run transaction is encapsulated into the proposed block and broadcast (460) to the network. A validator, e.g., miner, receives (465) the block and verifies all transactions. When a miner is not selected to be the block creator, it only validates the newly created block proposed by the lucky miner. If (470) the block is valid, then the block is applied (475) including the dApp running transaction. When a block is accepted, it could have packed many transactions, say in the thousands and all these transactions are applied to the nodes/blockchain.

In method 500 (FIG. 5A), a dApp owner creates (505) a connect transaction and broadcast the transaction to the network. A miner receives (510) the request and dispatches the request to the corresponding shard. If (515) the next block is a join block, then a join block miner starts to collect (520) transactions. There could be many transactions pending/waiting for a join block to be scheduled. Including transactions by the system shard and not just the shard that sends the 'connect' transaction. If the signature is valid (525), source and destination names valid (530), transaction sender is the source dApp owner (535), and connect fee sufficient (540), then the destination dApp connect policy (545) is checked. If the destination dApp allows the connect (550) and asynch dA.pp owner approval is not needed (555) or approved (560), then the source dApp's schedule property is set and place in the destination dApp shard (565). When a shard is connected to a different shard, the scheduling of its transactions gets moved to the thread of the destination shard. That way, the cross shard transactions between the two shards now are executed in the same thread and hence serialized. That is, updating where/which thread should the source (src) shard transactions should be run.

In method 570 (FIG. 5B), a destination dApp owner creates a link approval transaction and broadcast (572) the transaction to the network. A miner receives the request and dispatches (575) the request to the corresponding shard. If the next block is a join block (577) then a join block miner start to collect (580) transactions. If the signature is a valid (582) and approval shard connect request exists (585), then the source DApp schedule property is set and put into (587) the thread which the destination dApp shard belongs to. Method block 570 is similar to method 500 except that it is approved explicitly by a transaction initiated by the destination shard. Method 500 shows that the destination shard has a permission policy in place so it does not need to wait for the explicit approval transaction to trigger the scheduling thread change.

Figure 6:
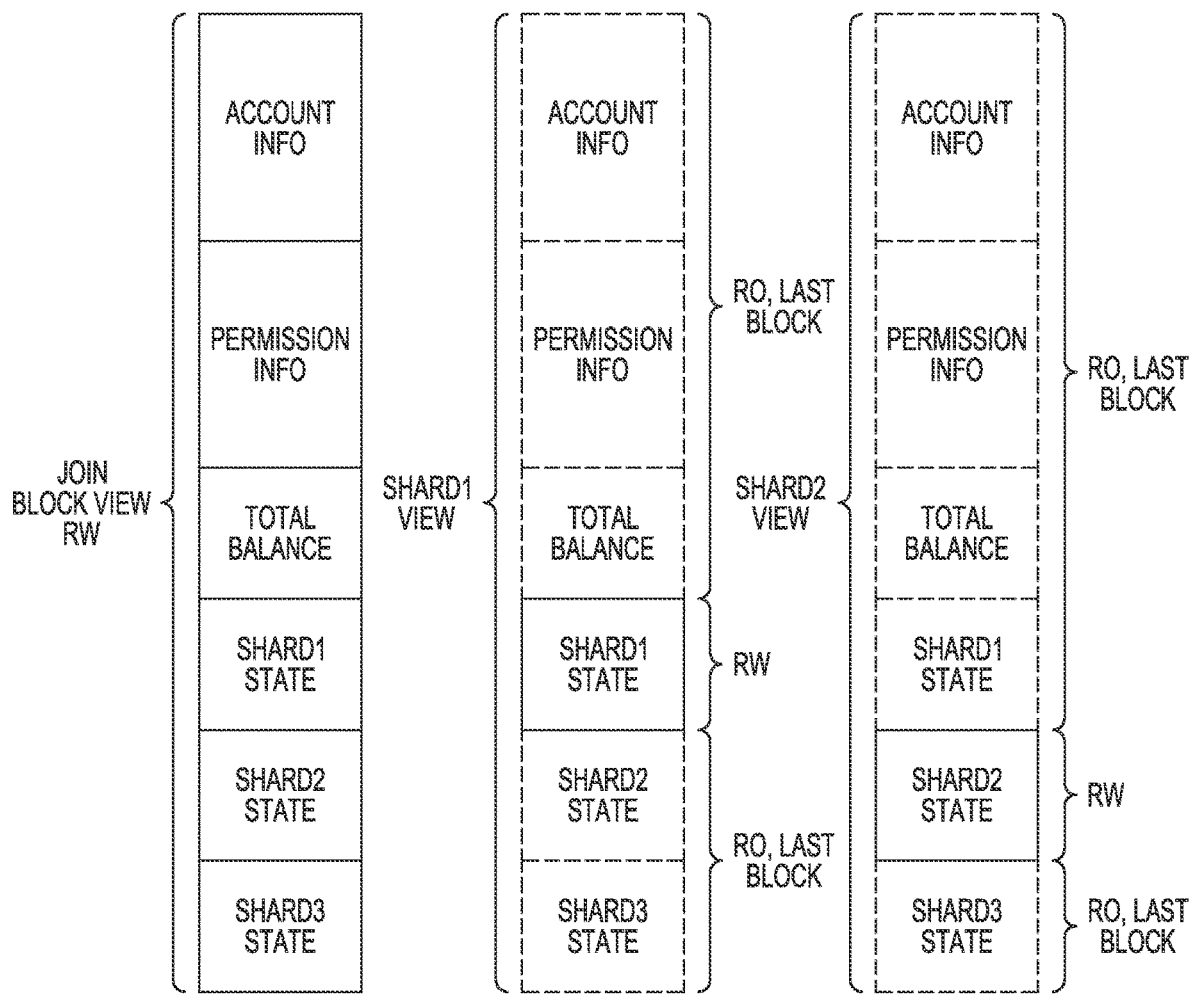
FIG. 6 shows an example unified system account model.

FIG. 6 shows an example optional unified system account model. Although embodiments support multiple shards, there may only be one unified account for each user in the system, There is no need to create a separate account within each shard.

Each shard can only modify its state in the account. In FIG. 6, Shard-1 can only modify shard-1's state. For other account contents, they can be read by any shard but cannot be modified (The content for other shard is not the current content, but a snapshot of the content of the previous block).

In each shard, the account can set specific permissions to control assets within the shard.

Figure 7:
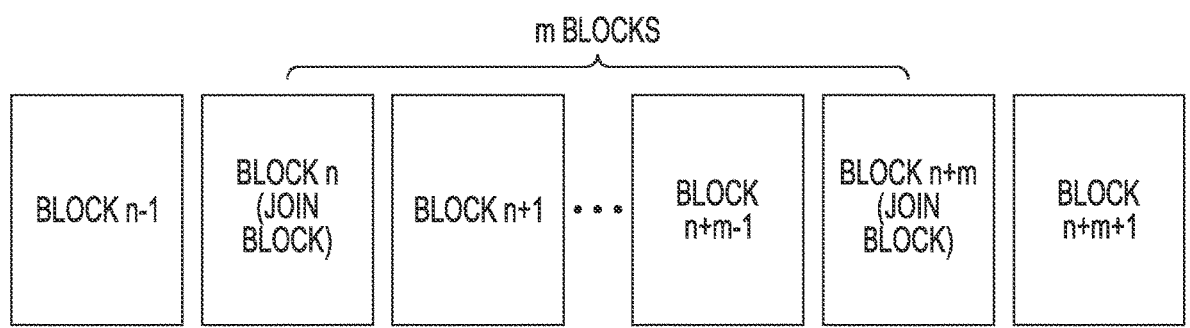
FIG. 7 shows a join block.

FIG. 7 shows a join block. In Join Block, since all shards stop executing, Join Block has control over all the account states and all fields in the account can be modified by Join Block.

Sharding solves the blockchain problem of scalability very well, but there are many operations on the chain that cannot be done within a single shard. Embodiments puts these kind of operations into the Join Blocks. A join block is a special block used to collect transactions for full-chain operations, rather than transactions for a specific shard. Join block is inserted into the chain periodically. When a Join Block is executed, all shards stop executing and the system can perform all operations safely. Join Block operations do not contain complex business contracts, so transactions can be performed in parallel in the Join Block. The following actions are performed in a Join Block:

Asset allocation: User has only one unified account in system for all shards. User assets can be allocated across the shards.

Shard management: Join Block has special permissions compared to regular blocks. Join Block can create, modify, connect shards and so on.

Account Management: including creation of accounts, permission modification and other operations.

Community Management: Community voting and execution of actions.

Other global management functions.

Join Block can be thought of as the operating system kernel. It is responsible for all management tasks, but it does not participate in specific business execution.

In the Join Block, all shards stop executions. Join Block/kernel thread has the authority of all resources in the chain. Therefore, whether or not transactions can be parallelized has a great influence on Join Block performance as follows:

$$TPS_{Joint\ Block} = \frac{P_{Sequence\ Process\ Power} \times N_{Parallel\ Transaction}}{m} \quad \text{Formula-3}$$

It can be seen from the formula that the Join Block performance depends on the degree of parallelism of the join Block internal transaction and the Join Block execution interval m. The execution interval is a fixed value, assuming 100. To achieve maximum parallelism Join Block limits the number of serialized operations. By adjusting in, Join Block performance can be improved if single-thread execution performance p is low.

Embodiments can efficiently support cross-shard communications. Cross-shard communications can be divided into three categories:
- simple cross-shard value transfer,
- weak synchronous read-only smart contract calls,
- Synchronous read-only contract calls, and writable smart contract calls.

Figure 8:
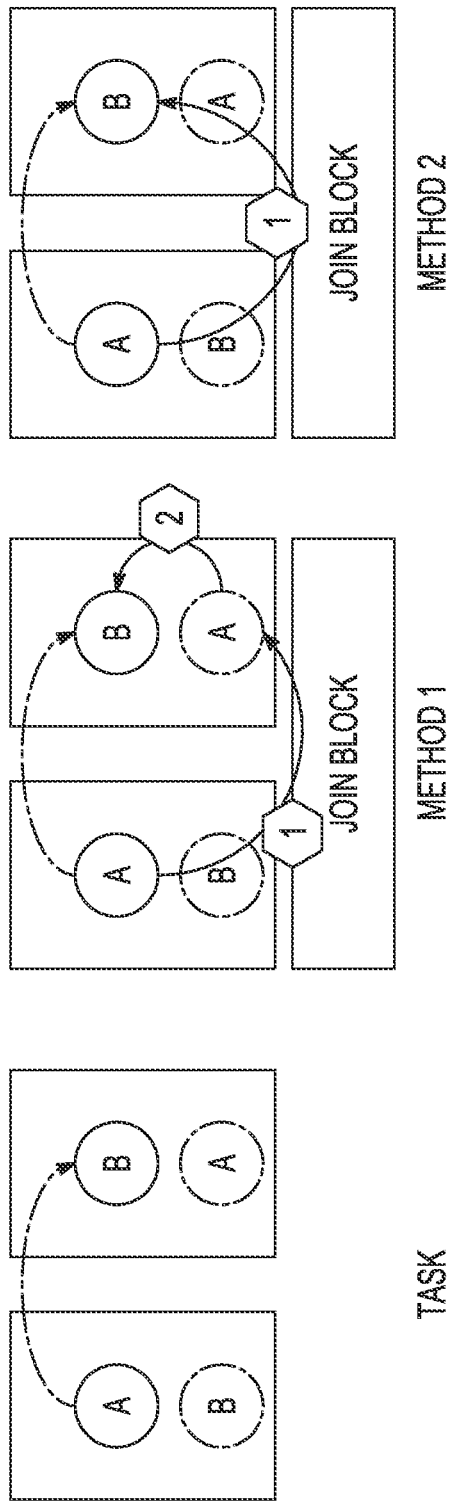
FIG. 8 shows an example cross-shard transfer.

FIG. 8 shows an example cross-shard transfer. Each user has only one account. If it is necessary to transfer funds to other accounts, or call contracts reside in another shard, the easiest way is to complete the operations through the "relocated asset" of the account in another shard. In FIG. 8, user A in shard-1 is trying to transfer to user B in shard-2:

Embodiments divide cross-shard transfers into two steps. If A has assets in Shard-2 where B belongs, A can transfer assets directly to B in Shard 2. This method actually uses intra-shard transaction to complete a cross shard transaction, and most of the cross-shard transactions belong to this category. If A does not have asset in Shard-2, the transaction will be divided into two steps: the first step is to do a re-allocation of A's assets into the asset of A in Shard-2, and the 2nd step is to complete the transfer in Shard-2. Embodiments can use this method to transfer of enough assets to support multiple future transfers within Shard 2.

Direct Transfer in Join Block: This method is limited to that A is not associated with shard 2 and is not intended to be related in the future. This approach involves two accounts that will reduce the parallelism of the transaction. In addition, due to the use of multiple Join Block resources, it will require higher fees than the relocating asset to the shard-method. Users are not recommended to use this method for high-frequency transactions.

On the contrary the relocating asset to the shardmethod uses the resources of the Join Block only during the redistribution of account assets Which is a parallel operation. Therefore, relocating asset to the shardmethod can quickly complete the value transfer between shards with lower cost required.

Figure 9:
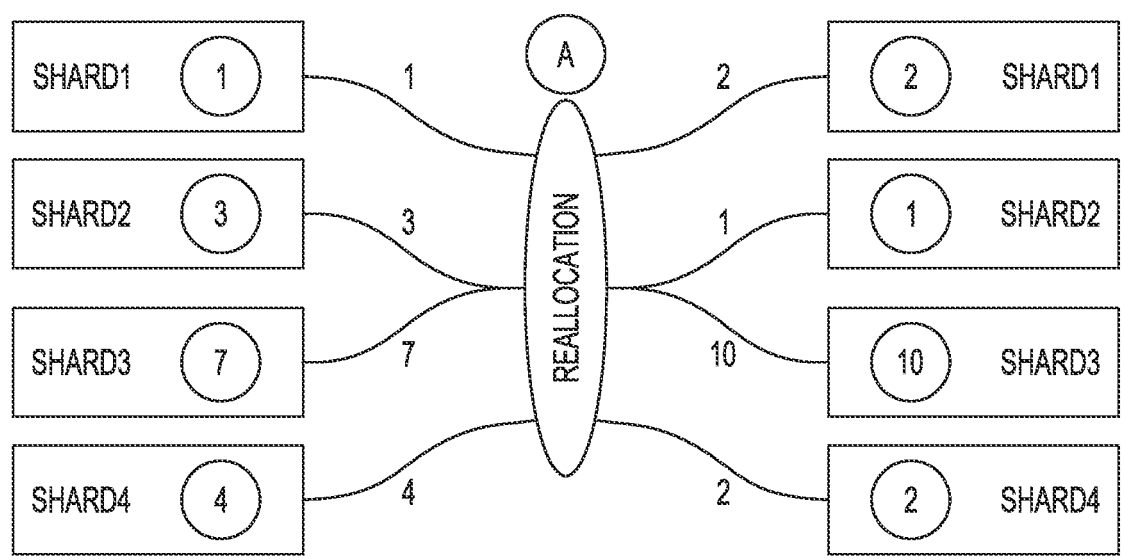
FIG. 9 shows an account asset re-distribution among shards.

FIG. 9 shows an account asset re-distribution among shards. Embodiments support, infinite sharding with 8-byte shard names, and efficient asset transfer between shards. Redistribution of assets among shards can be done in one transaction.

The asset redistribution transaction is similar to an asset allocation plan. There are multiple inputs and outputs in this scenario: all input totals are equal to all output totals. Asset reallocation has the following features:

The owner of the input and output belongs to the same account. No support for the allocation of assets among multiple accounts (transfers and other operations can be completed in the system shards).

Users can submit as many as possible inputs and outputs in one transaction, instead of using multiple distribution schemes to achieve the same effect. There is a fixed fee for each transaction in the Join Block. If multiple allocation plans are submitted, it will cost more to allocate.

Cross-Shard Smart Contract Calls

Embodiments support cross-shard smart contract invocations efficiently. There are two types of cross-shard smart contract calls: a) weak synchronous read-only contract calls, b) synchronous read-only contract calls and read-write contract calls. The performance of weak synchronous read-only contract calls is close to that of single Blockchain and the cost of synchronous read-only contract calls and read-write contract calls is higher. Therefore, when designing a dApp, developers should place all smart contracts in the same shard as much as possible, avoid using synchronous read-only contract calls or reading and writing contract invocation contracts in different shards.

Figure 10:
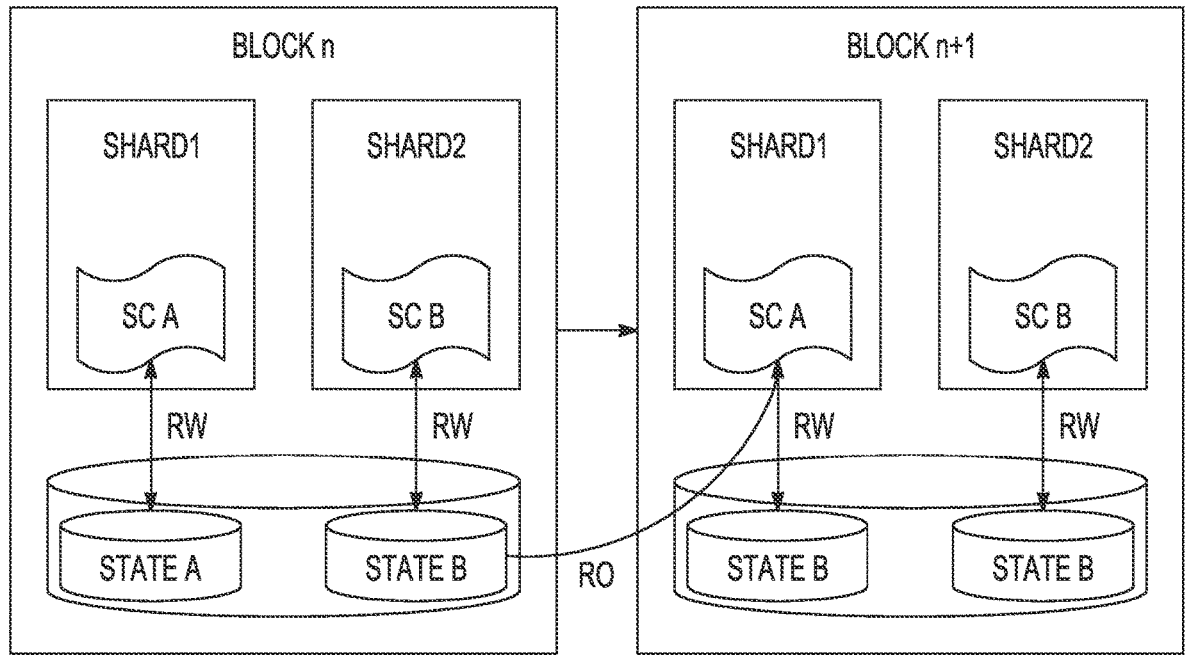
FIG. 10 shows read-only weak synchronous smart contract calls.

FIG. 10 shows read-only weak synchronous smart, contract calls. The implementation of weak synchronous read-only contract calls is based on state snapshots in previous block.

In Block n, smart contracts A, B can read and modify their own data. In Block n+1, the state of the smart contract B is divided into two, one is a read-only snapshot of Block n, which is used by the smart contract A. The other is the real-time status data in Block n+1, which is used by the smart contract B. Smart contract A reads the previous Block contract data, while smart contract B changes the current contract data. Due to the use of state snapshots, there is no difference between read-only contract invocation performance and intra-shard smart contract invocation.

Figure 11:
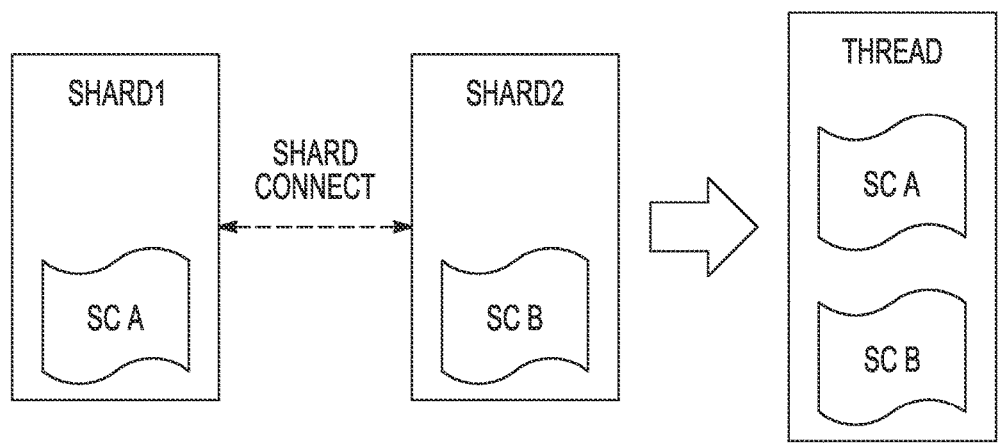
FIG. 11 shows synchronous read-only, read and write smart contract call implementation.

FIG. 11 shows synchronous read-only, read and write smart contract call implementation. Completely synchronous read-only contract calls and read-write contract calls are more complex than weak synchronous read-only calls due to the following reasons:

To modify the state of smart contract B through a contract call, or to read the state of smart contract B in real time, at the same time the contract is also being called in shard-2 to modify the state, the race condition (programs are executing in parallel for the same data operation) will cause the result to be indeterminate, and hence will fail to be verified by other nodes. This is a typical resource contention and race condition problem in operating systems. There are two ways to solve this problem in an operating system design. One is to use locks, and the other is to do serialization. The use of locks in a blockchain can cause uncertainty due to each the node is running its own locking process. Embodiments use serialization to solve this problem instead.

User (not a smart contract) A in shard-1 calls a smart contract in shard-2. This can be done via user A's account's relocated asset in shard 2 to call the smart contract directly in Shard-2 as an intra-shard smart contract call.

For a smart contract in shard-1 to call a smart, contract in shard-2, embodiments connect two shards together in the same execution body internally. It appears to the application that the two dApps are running in two separate shards. In fact, the underlying layer executes two connected shards in the same thread. This technique is called connecting shards.

Figure 12:
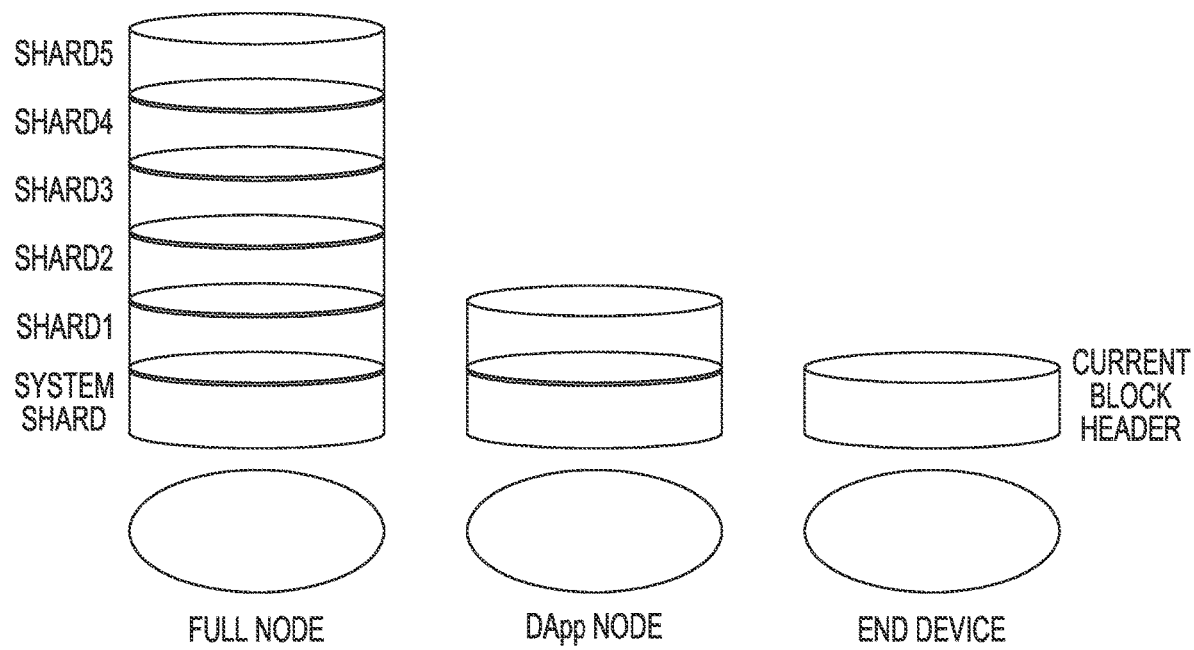
FIG. 12 shows tiered storage.

FIG. 12 shows tiered storage. All nodes will save system shard data and data belonging to their own dApp shard. According to the node's storage tier, nodes can be divided into the following types:

Full node: The full node stores all the data in the chain. All nodes will provide services to the entire network to help IoT devices and other thin nodes complete Merkle certification. All nodes will provide API services to other nodes at the same time.

dApp node: The dApp node stores system shards' and dApp shard's data. dApp shard will also provide this shard's service to other nodes.

End users: The consensus algorithm is not a PoW algorithm. End user needs to store the latest set of verifiers to complete Merkle's proof, for example see Simplified Payment Verification (SPV).

Figure 13:
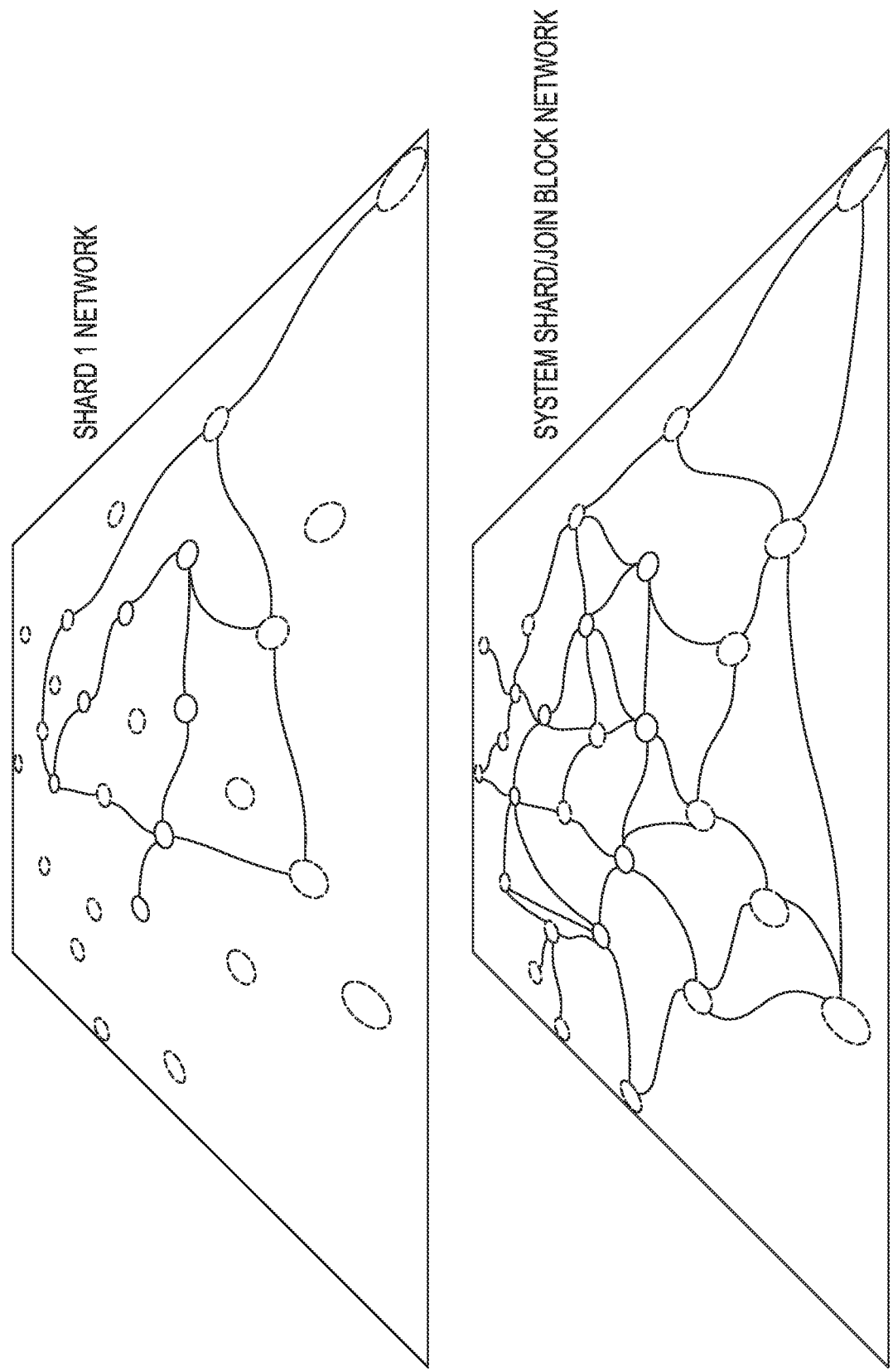
FIG. 13 shows hierarchical networks.

FIG. 13 shows hierarchical networks. DApp-based sharding brings changes to the underlying network. With dApp-based sharding network traffic mostly needs to be distributed within a shard rather than over the entire network.

As shown in FIG. 13, a first tier network is for the system shards and the Join Block. All users, including miners, will join this network. A second layer is the network layer of Shard-1. Shard-1 users and miner nodes will also join this layer of the network.

Figure 14:
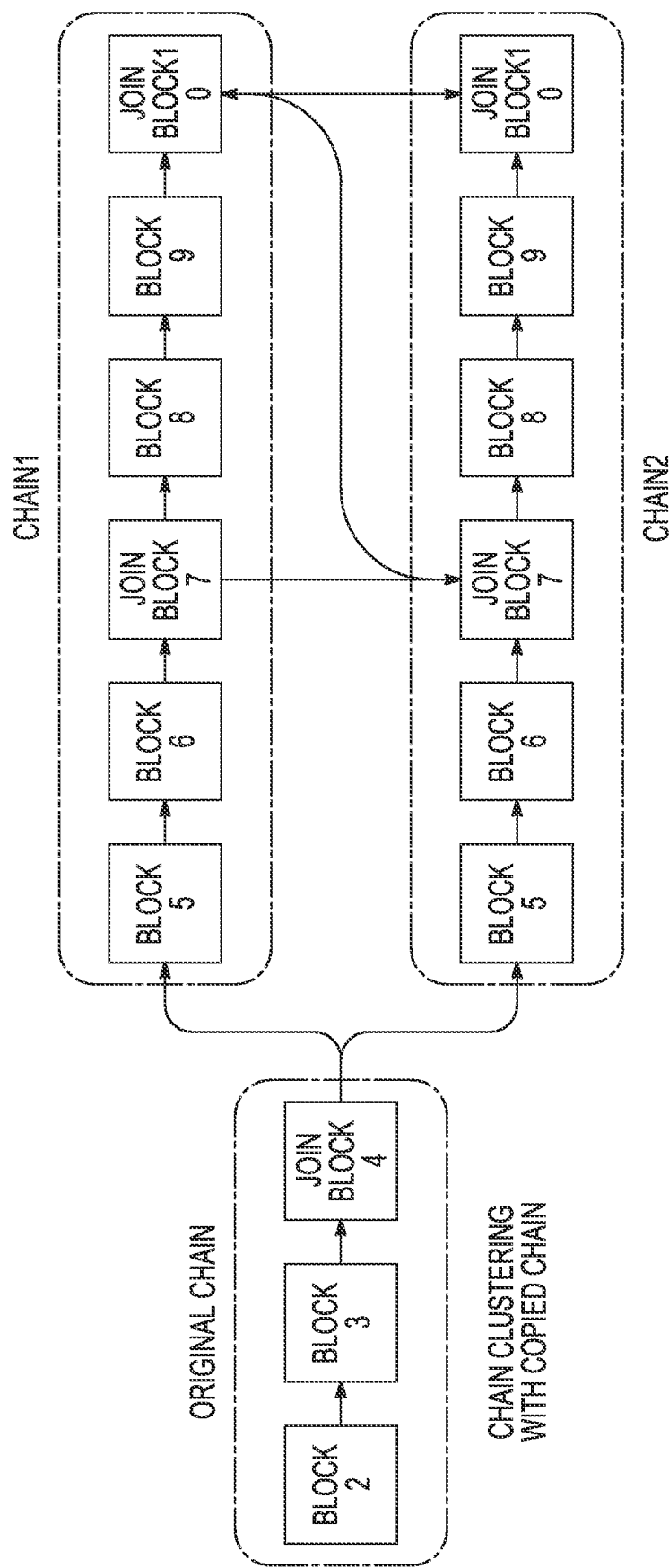
FIG. 14 shows chain clustering.

FIG. 14 shows chain clustering. Blockchain performance requirements will grow over time, and accordingly, increasing miner hardware resources (cluster deployment) can linearly increase the processing power of embodiments. Hardware stacking brings resource centralization, resulting in fewer potential nodes that can provide resources, resulting in a trend towards centralized Blockchain networks. The solution to this problem is similar to the Cell Division in biology. In biology, when cells absorb nutrients and cannot maintain their own volume, cells begin to divide, splitting from single cells into two cells. When the resources in the chain are limited or the centralizing risk is rising, it will be split into two balanced block chains from a single chain. Over time, a Blockchain duster is formed. Performance constraints and centralization trends are the driving forces for the splitting of the chain. The newly generated two chains after splitting are implemented in substantially similar way as the original chain: each chain has a separate block chain, a separate miner set, and separate Join Blocks. After splitting, the sibling chains communicate with each other through their Join Blocks. The creation of blocks in each chain requires verification only by the miners within that chain. Chain splitting will not cause a drop in the security level of the sibling chains. Miners in the sibling chain are not elected in the sibling chain, but are globally elected in embodiments.

Chain clustering technology has the following characteristics:

Chain splitting is driven by the community. When the capacity of the system is saturated, the community decides whether to split by voting.

When the chain is split, the system splits base on dApp shards. When the system completes the split, the distribution of the total Tokens and Tokens held by the two siblings is close to each other. A single chain Token does not affect the security of the new chain because the miners are appointed by the system rather than elected by Tokens in the chain.

Intra-chain miners only need to deal with their own intra-chain and cross-chain transactions.

Figure 15:
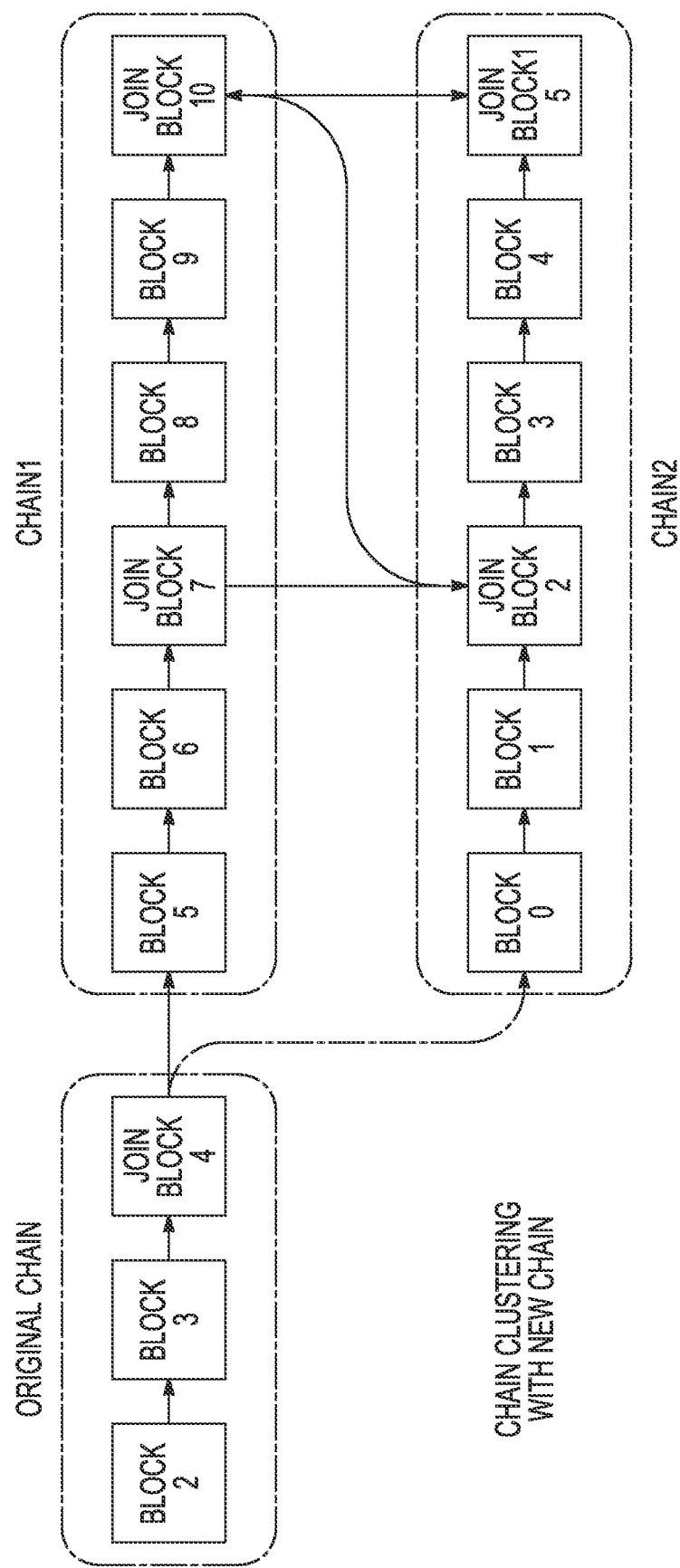
FIG. 15 shows chain splitting as a new sibling chain.

FIG. 15 shows chain splitting as a new sibling chain. Embodiments support two chain splitting methods. As shown in FIG. 15, a newly split chain starts with its own genesis block. The method does not need to integrate the state of the pre-existing chain, so the miner's storage space can be saved. When the new dApp enters embodiments, it can choose the new chain. However, if the existing dApp is to be migrated to a new chain, the past states are cleared.

A copy (fork) method, as shown in FIG. 11, means that when the chain runs to a Join Block, a new chain is generated through the active forking. When generating a new chain, the system closes the corresponding dApp on both chains according to the settings. DApp shards, are distributed on both chains, rather than retaining all dApps in the existing chain. The copy method can make dApp seamlessly migrate to the new chain because each chain still preserves the state of the existing chain. This seamless migration is friendlier to existing dApps. The disadvantage of the copy method is that all the states of the existing chain need to be kept on the new chain too with storage space occupied.

Figure 16:
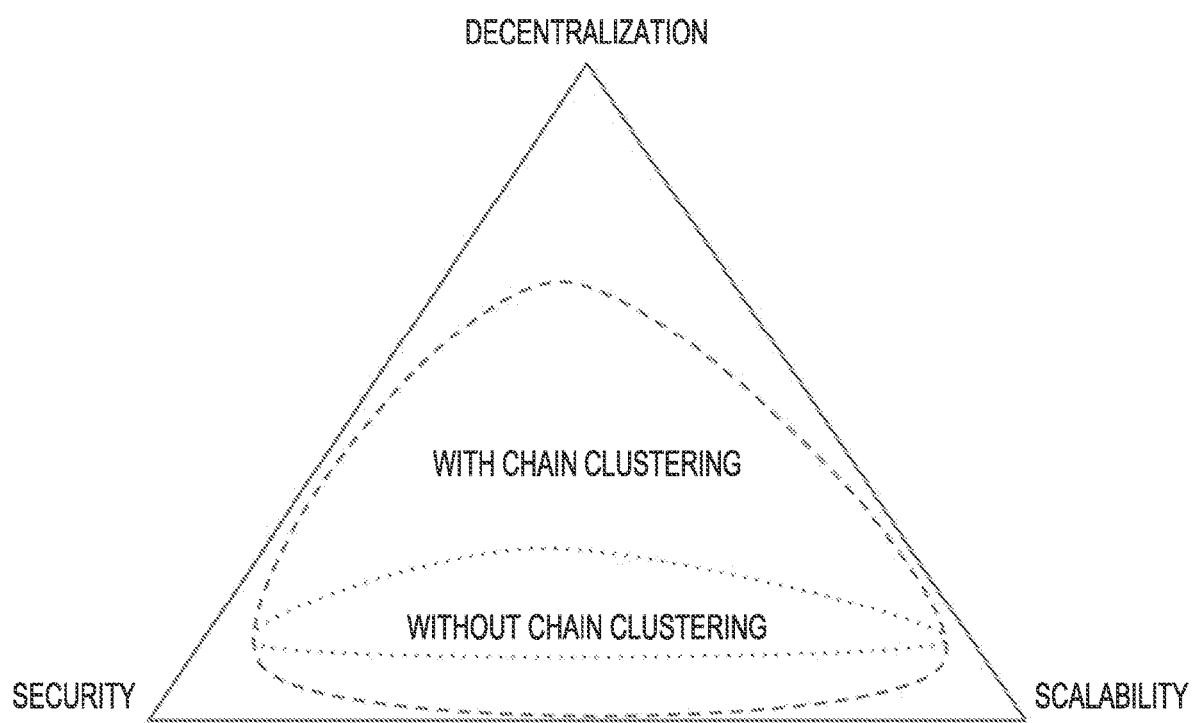
FIG. 16 shows Decentralization, Security and Scale (DSS) analysis.

FIG. 16 shows Decentralization, Security and Scale (DSS) analysis. After splitting, the transactions are allocated to the two chain of the cluster. The number of transactions carried in each chain decreases, reducing the demand for hardware resources and increasing the level of decentralization. The miners in each chain are elected globally. Chain splitting does not reduce the security of the system.

From the perspective of Decentralization, Security and Scale (DSS) analysis as in FIG. 16, decentralization level of the system increases compared to the level before the splitting.

Figure 17:
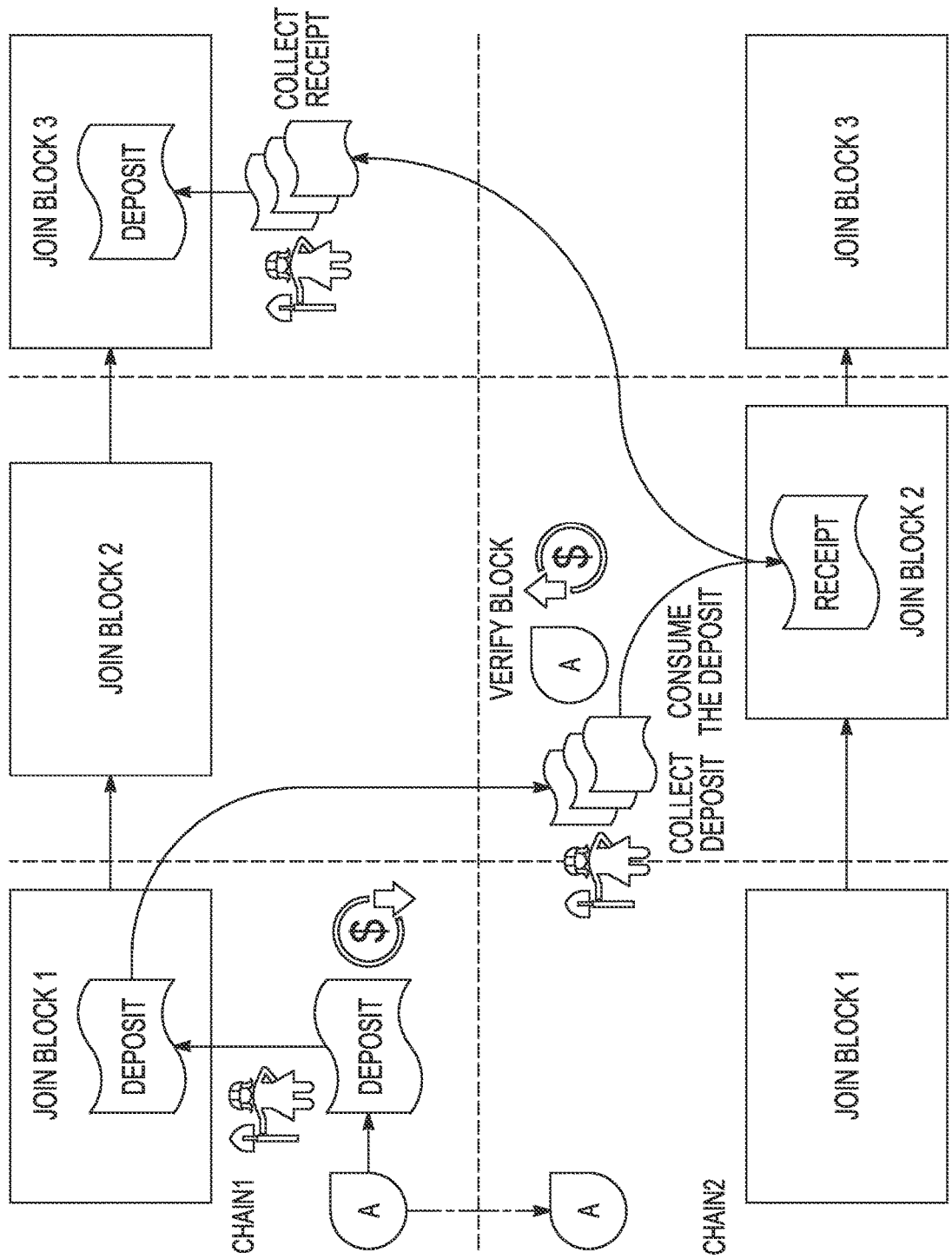
FIG. 17 shows a Cross-chain transaction for a same account of a user.

FIG. 17 shows a Cross-chain transaction for a same account of a user. Cross chain communication is done by Join Blocks. Each account has two kinds of balances, shard and chain. Within the same chain, cross-shard communication is the same as the original mechanism. Cross-chain communication follows the following principles:

Minimize cross-chain communications due to the increased costs compared to in-chain communications. Cross-chain communication is also limited to the same account. Different accounts can be completed in two steps: the first step is to complete the cross-chain communication of the same account, and the second step is to complete the communication between different accounts in the same chain.

Cross-chain communication for the same account is divided into two steps: The first step is to make a deposit: the initiator of the cross-chain communication first completes the cross-chain communication deposit in the chain where it is located, and miner in this chain execute/validate the deposit. After the completion of the mining, a receipt will be generated and sent to the destination chain as a transaction. In the second step, after the destination link receives the transaction, the Join Block of the destination chain will prove the validity of the receipt based on the information such as the chain and block where the receipt is located. If the receipt is valid, the receipt will be spent to update the balance value of the account in the chain.

FIG. 17 depicts cross-chain transaction for the same account of user A.

User A in chain 1 to send to user A the chain-2:

First, user A broadcasts the transaction.

After the miners in chain-1 receive the transaction, the transaction is executed and validated, and a deposit receipt is created. The same value is deducted for user A's balance in chain 1.

When the miners in chain-1 verify the deposit, system miners, including miners in chain 2, authenticate the transaction.

When the miners in chain-2, receives a deposit receipt, it is included in the receipt pool of chain-2.

When the miner in chain-2 creates a join block, the miner in chain-2 spends the receipt and increases A's balance by the same value in Chain-2.

Figure 18:
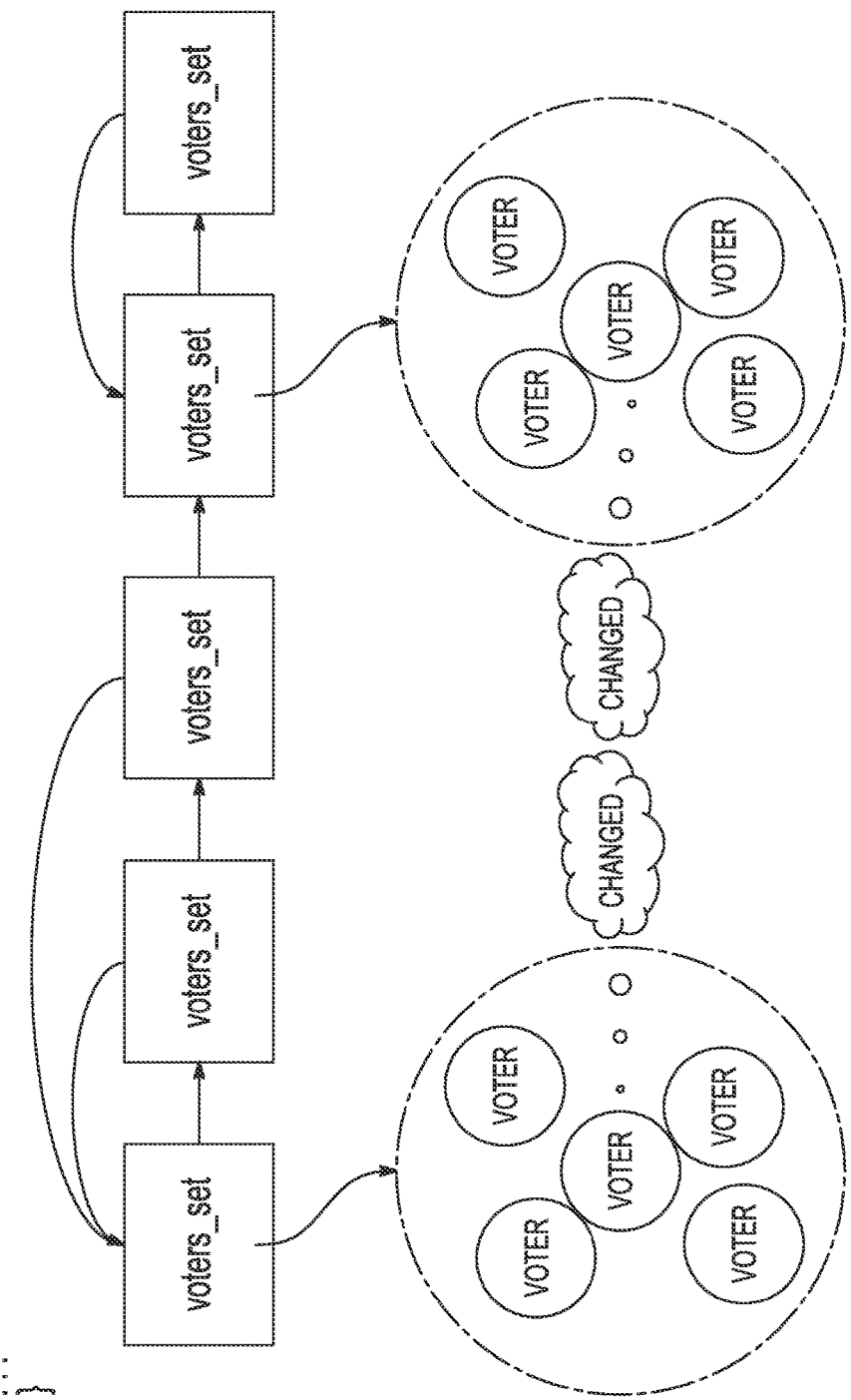
FIG. 18 shows Block Definition to Support PoS SPV.

FIG. 18 shows Block Definition to Support PoS SPV.

In embodiments, simplified payment verification (SPV) is quite different from simplified verification of PoW. In PoW, SPV is an independently solving a mathematical problem—as long as the calculated hash value satisfies the block header difficulty requirement. This mathematical problem has nothing to do with the state of the chain. However, for PoS, there is no such mathematical problem to solve. Instead, a set of verifier signatures is used to determine whether the block is valid. This group of block signers exists on the chain, relying on a verification of the chain state will cause the light wallet to be in a chicken and egg situation. The light weight wallet needs the full chain info to gather the verifier set but it does not have the full chain info as a light weight node.

Embodiments stores the verifier set in the join Block. The header of Join Block in embodiments indicates the corresponding set of verifiers. If the Join Block's verifier set is the same as a previous join block, it only needs to specify the block number of the Join Block that holds the verifier set.

FIG. 18 is the definition of the block header and the specific verification process:

For thin nodes, the current set of verifiers needs to be maintained. When the thin node starts, an unmodifiable verifier set is built in. It starts to obtain the current block directly from the network. Then it reverts to the block which has the verifier set changed and uses that verifier set for verification, and compares the verifier set to the verifier set that was built in. If they are the same, the thin node can start using the current verifier set. Otherwise, it continues to look for the previous block which has the verifier set changed until it finds the block that has the verifier set that matches the built-in one. If there is never a match of the saved verifier set, there is a security problem. If there is a match, the current most recent verifier set can start to be used instead of the verifier set that's built-in.

Light Client Verification (LCV) method may be adopted to solve the storage issue with large number of block headers.

Figure 19:
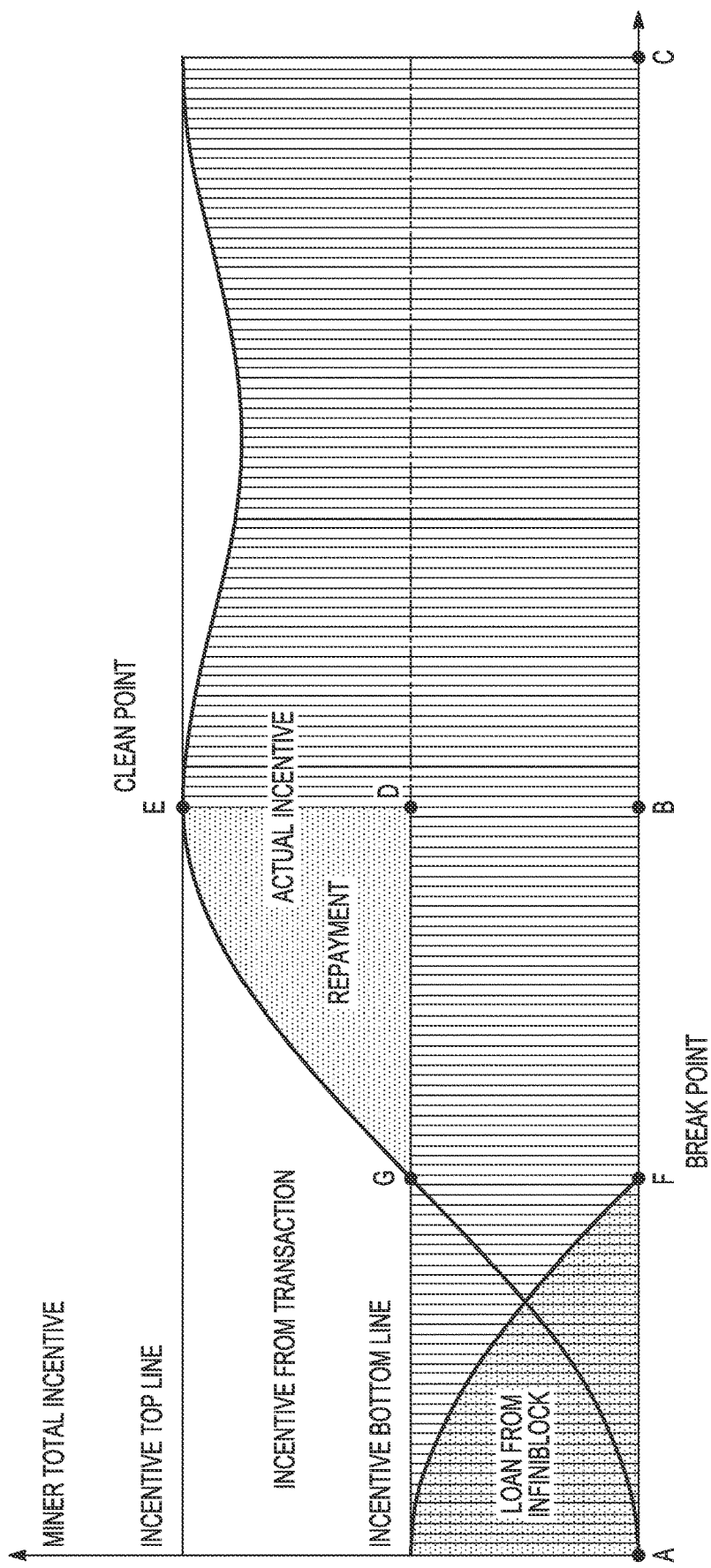
FIG. 19 shows an Incentive model for blockchain miners.

FIG. 19 shows an Incentive model for blockchain miners. Embodiments adopt a dApp-friendly crypto-economics model to solve the problem of high transaction fees of existing public blockchains due to its token appreciation. Users of dApps do not need to pay transaction fees. However, for the system to operate, the miners need to be incentivized. Embodiments uses a transaction fee payment method that will be net fee-free for the users and yet at the same time incentivizing the miners.

Embodiments uses transaction fees to motivate miners. However, before the system is widely adopted, there may not be many paid transactions in the chain, which will lead to a decline in miners' willingness to mine, thus reducing the security of the chain, Embodiments uses a loan model to solve this problem, as shown in FIG. 19.

At the beginning of the operation, the number of dApps in the system is low, resulting in insufficient paid transactions. In this case, the miner is given incentives to the miner's Incentive Bottom Line by system loans.

As the number of transactions increases, the transaction fees aggregated of the system will also increase. When the transaction fees of the system increase to the breakeven point (point G in FIG. 19), embodiments stops borrowing from the system because the transaction fee is sufficient to support the miner's incentive bottom line.

The system's transaction fee income continues to increase. After paying for miners' incentives, there is a surplus. The surplus will be used to repay the system loan first until the loan is fully paid by point E in FIG. 19.

The transaction income of the system continues to increase. When the system's incentive top line is reached, the system will start the transaction fee reduction warning and incentivize the miners according to the upper limit. The surplus will remain in the miners pool until this part of the incentive is exhausted.

Transaction fees are derived from the use of Join Block and the use of storage for the system. The charge for the use of Join Block is mainly to avoid the abuse of Join Block and incentives for the miners. The charge for the use of system storage is mainly to pay for miners' storage investments. Ordinary transactions also need to be stored, but this part of the storage does not require a fee, only the state storage used by the dApp is charged. The source of transaction fee is given by the following formula:

$$\text{Incentive}_{total} = \text{Fee}_{Join\ Block} + \text{Fee}_{State\ Storage}$$

The system will issue candy to all accounts holding Tokens. Candy is used to motivate miners. The formula for the distribution of candy is as follows:

$$\text{Candy}_{user} = \text{Token}_{user} \times \text{Duration}_{Hold\ Token}$$

As shown from the formula above, the distribution of candy is determined by the number of Tokens held by the account and the holding time.

Users will use candy for transactions. For the use of Join Block and state storage, in addition to paying candy, one will also need to pay Token. The miners decide whether to include the transaction based on the computing resources, network resources and storage resources of the transaction, and the number of candies they are willing to pay.

Embodiments use candy instead of Token as a transaction fee voucher, which means that the transaction is free of charge while preventing the system resources from being abused.

The rewards of a single miner is carried out in every Join Block, Each Join Block is both the beginning of a reward cycle and the end of the previous reward cycle. The incentive of the miner comprises of two parts. One is the total amount in the bonus pool, and the other is the proportion of each miner's share in the prize pool, as described in the following formula:

$$\text{Incentive}_{miner} = \text{Incentive}_{total} \times \text{Ratio}_{miner}$$

Candies are used to decide the ratio, Therefore, the distribution formula can be described as the following. The more candies the miner collects, the more rewards the miner gets.

$$\text{Incentive}_{miner} = \text{Incentive}_{total} \times \frac{\text{Candy}_{miner-collected}}{\sum \text{Candy}_{miner-collected}}$$

Software Architecture

Figure 20:
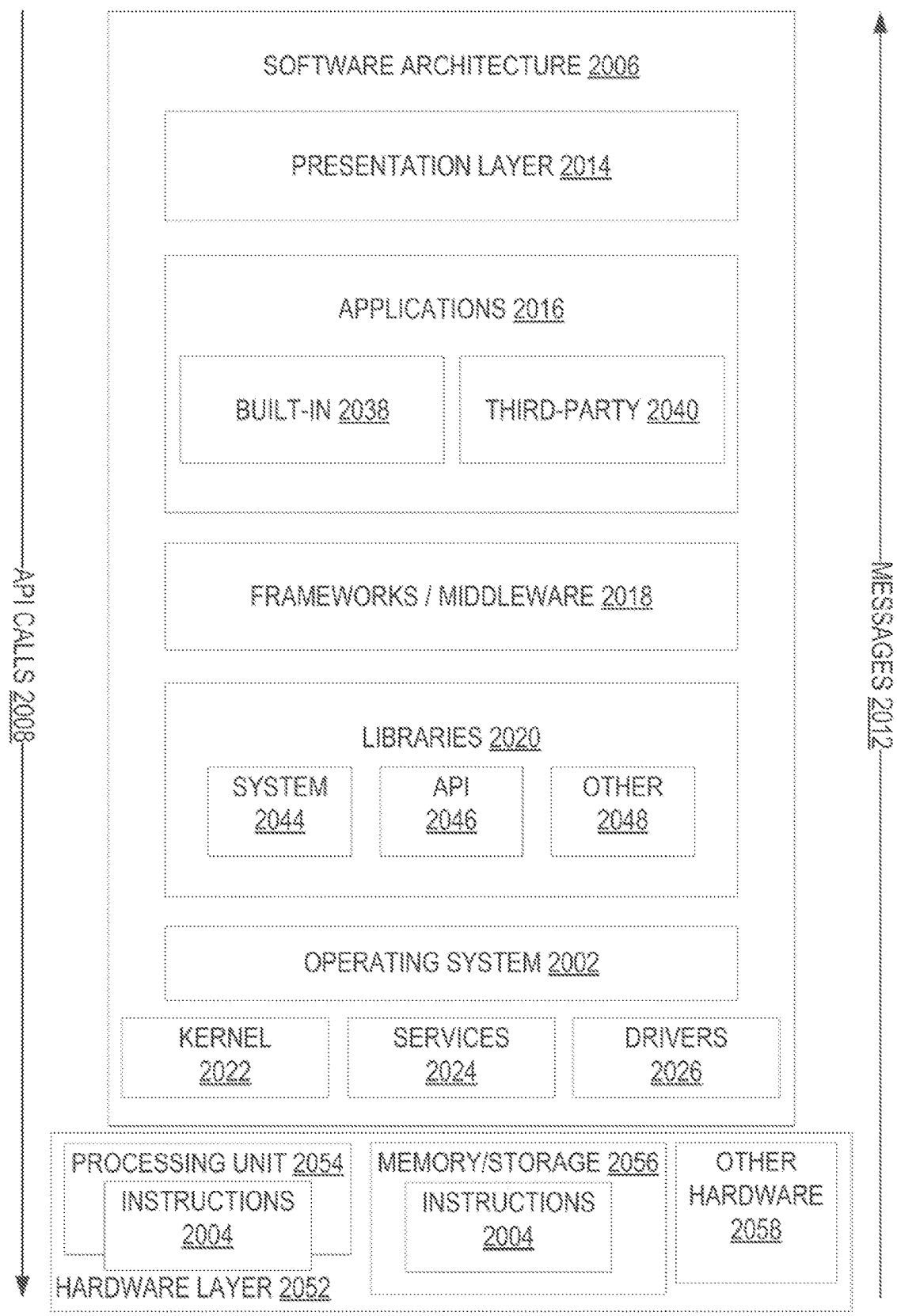
FIG. 20 is a block diagram illustrating a representative software architecture, which may be used in conjunction with various hardware architectures herein described.

FIG. 20 is a block diagram illustrating an example software architecture 2006, which may be used in conjunction with various hardware architectures herein described. FIG. 20 is a non-limiting example of a software architecture 2006 and it will be appreciated that many other architectures may be implemented to facilitate the functionality described herein. The software architecture 2006 may execute on hardware such as machine 2100 of FIG. 21 that includes, among other things, processors 2104, memory 2114, and (input/output) I/O components 2118. A representative hardware layer 2052 is illustrated and can represent, for example, the machine 2100 of FIG. 21. The representative hardware layer 2052 includes a processing unit 2054 having associated executable instructions 2004. Executable instructions 2004 represent the executable instructions of the software architecture 2006, including implementation of the methods, components, and so forth described herein. The hardware layer 2052 also includes memory and/or storage modules memory/storage 2056, which also have executable instructions 2004. The hardware layer 2052 may also comprise other hardware 2058.

In the example architecture of FIG. 20, the software architecture 2006 may be conceptualized as a stack of layers where each layer provides particular functionality. For example, the software architecture 2006 may include layers such as an operating system 2002, libraries 2020, frameworks/middleware 2018, applications 2016, and a presentation layer 2014. Operationally, the applications 2016 and/or other components within the layers may invoke API calls 2008 through the software stack and receive a response such as messages 2012 in response to the API calls 2008. The layers illustrated are representative in nature and not all software architectures have all layers. For example, some mobile or special purpose operating systems may not provide a frameworks/middleware 2018, while others may provide such a layer. Other software architectures may include additional or different layers.

The operating system 2002 may manage hardware resources and provide common services. The operating system 2002 may include, for example, a kernel 2022, services 2024, and drivers 2026. The kernel 2022 may act as an abstraction layer between the hardware and the other software layers. For example, the kernel 2022 may be responsible for memory management, processor management (e.g., scheduling), component management, networking, security settings, and so on. The services 2024 may provide other common services for the other software layers. The drivers 2026 are responsible for controlling or interfacing with the underlying hardware. For instance, the drivers 2026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 2020 provide a common infrastructure that is used by the applications 2016 and/or other components and/or layers. The libraries 2020 provide functionality that allows other software components to perform tasks in an easier fashion than to interface directly with the underlying operating system 2002 functionality (e.g., kernel 2022, services 2024 and/or drivers 2026). The libraries 2020 may include system libraries 2044 (e.g., C standard library) that may provide functions such as memory allocation functions, string manipulation functions, mathematical functions, and the like. In addition, the libraries 2020 may include API libraries 2046 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2020 may also include a wide variety of other libraries 2048 to provide many other APIs to the applications 2016 and other software components/modules.

The frameworks/middleware 2018 (also sometimes referred to as middleware) provide a higher-level common infrastructure that may be used by the applications 2016 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be used by the applications 2016 and/or other software components/modules, some of which may be specific to a particular operating system 2002 or platform.

The applications 2016 include built-in applications 2038 and/or third-party applications 540. Examples of representative built-in applications 2038 may include, but are not limited to, a contacts application, a browser application, a book reader application, a location application, a media application, a messaging application, and/or a game application. Third-party applications 2040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2040 may invoke the API calls 2008 provided by the mobile operating system (such as operating system 2002) to facilitate functionality described herein.

The applications 2016 may use built in operating system functions (e.g., kernel 2022, services 2024 and/or drivers 2026), libraries 2020, and frameworks/middleware 2018 to create user interfaces to interact with users of the system. Alternatively, or additionally, in some systems, interactions with a user may occur through a presentation layer, such as presentation layer 2014. In these systems, the application/component "logic" can be separated from the aspects of the application/component that interact with a user.

Figure 21:
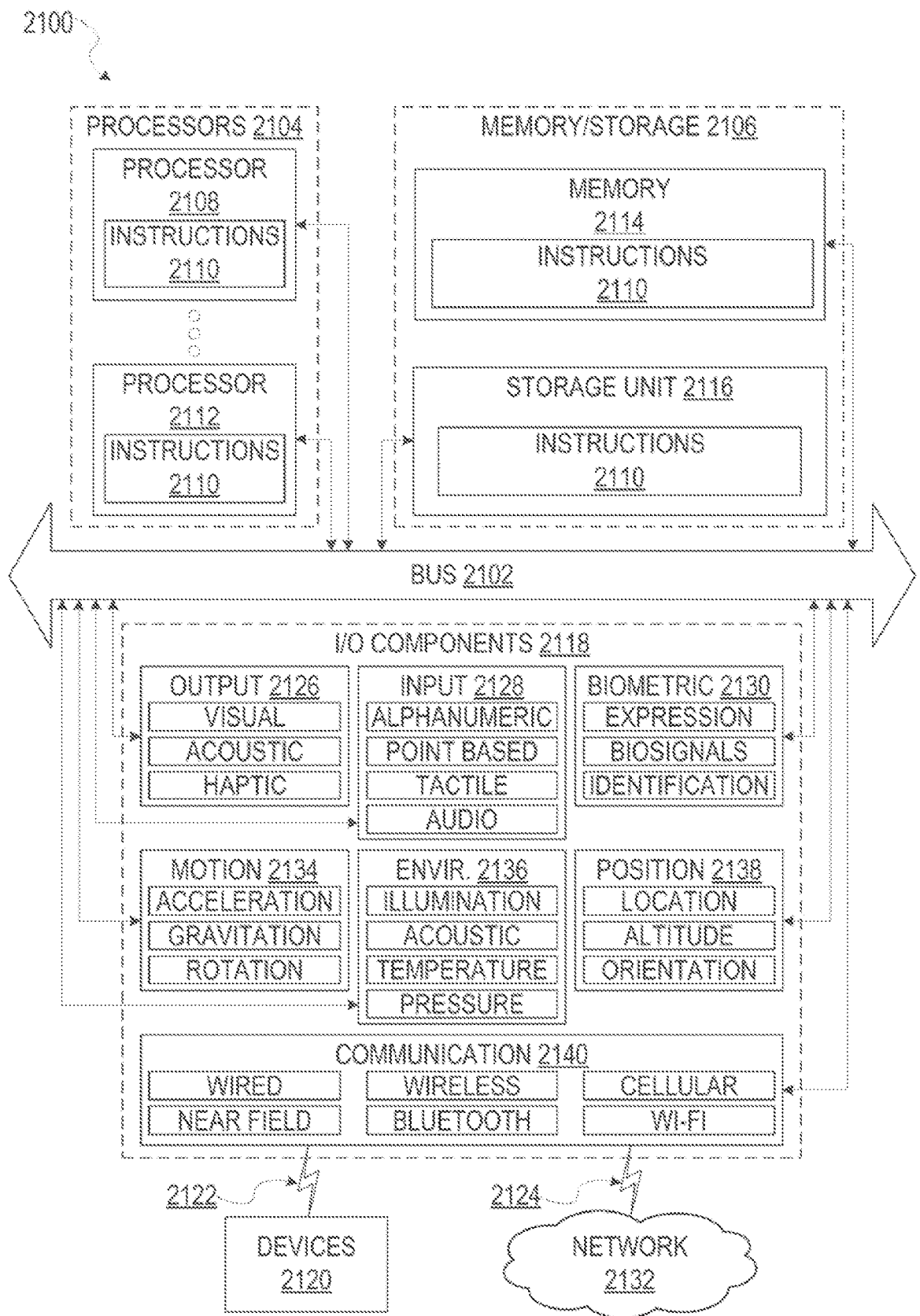
FIG. 21 is a block diagram illustrating components of a machine, according to some example embodiments, able to read instructions from a machine-readable medium (e.g., a machine-readable storage medium) and perform any one or more of the methodologies discussed herein.

FIG. 21 is a block diagram illustrating components of a machine 2100, according to some example embodiments, able to read instructions 2104 from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2110 (e.g., software, a program, an application, an apples, an app, or other executable code) for causing the machine 2100 to perform any one or more of the methodologies discussed herein may be executed. As such, the instructions 2110 may be used to implement modules or components described herein. The instructions 2110 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (SIB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2110, sequentially or otherwise, that specify actions to be taken by machine 2100. Further, while only a single machine 600 is illustrated, the term "machine" shall also be taken to include a collection of machines that individually or jointly execute the instructions 2110 to perform any one or more of the methodologies discussed herein.

The machine 2100 may include processors 2104, memory/storage 2106, and I/O components 2118, which may be configured to communicate with each other such as via a bus 2102. The memory/storage 2106 may include a memory 2114, such as a main memory, or other memory storage, and a storage unit 2116, both accessible to the processors 2104 such as via the bus 2102. The storage unit 2116 and memory 2114 store the instructions 2110 embodying any one or more of the methodologies or functions described herein. The instructions 2110 may also reside, completely or partially, within the memory 2114, within the storage unit 2116, within at least one of the processors 2104 (e.g., within the processor's cache memory), or any suitable combination thereof, during execution thereof by the machine 2100. Accordingly, the memory 2114, the storage unit 2116, and the memory of processors 2104 are examples of machine-readable media.

The I/O components 2118 may include a wide variety of components to receive input, provide output, produce output, transmit information, exchange information, capture measurements, and so on. The specific I/O components 2118 that are included in a particular machine 2100 will depend on the type of machine. For example, portable machines such as mobile phones will likely include a touch input device or other such input mechanisms, while a headless server machine will likely not include such a touch input device. It will be appreciated that the I/O components 2118 may include many other components that are not shown in FIG. 21. The I/O components 2118 are grouped according to functionality merely for simplifying the following discussion and the grouping is in no way limiting. In various example embodiments, the I/O components 2118 may include output components 2126 and input components 2128. The output components 2126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2118 may include biometric components 2130, motion components 2134, environmental components 2136, or position components 2138 among a wide array of other components. For example, the biometric components 2130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2134 may include acceleration sensor components (e.g., accelerometer), gravitation sensor components, rotation sensor components (e.g., gyroscope), and so forth. The environmental components 2136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2118 may include communication components 2140 operable to couple the machine 2100 to a network 2132 or devices 2120 via coupling 2124 and coupling 2122, respectively. For example, the communication components 2140 may include a network interface component or other suitable device to interface with the network 2132. In further examples, communication components 2140 may include wired communication components, wireless communication components, cellular communication components, near field communication (NEC) components, Bluetooth® components (e.g., Bluetooth® Low Energy), Wi-Fi® components, and other communication components to provide communication via other modalities. The devices 2120 may be another machine or any of a wide variety of peripheral devices (e.g., a peripheral device coupled via a USB).

Moreover, the communication components 2140 may detect identifiers or include components operable to detect identifiers. For example, the communication components 640 may include radio frequency identification (REID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC IHSS-2D bar code, and other optical codes), or acoustic detection components (e.g., microphones to identify tagged audio signals). In addition, a variety of information may be derived via the communication components 2140, such as, location via. Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 2110 for execution by the machine 2100, and includes digital or analog communications signals or other intangible medium to facilitate communication of such instructions 2110. Instructions 2110 may be transmitted or received over the network 2132 using a transmission medium via a network interface device and using any one of a number of well-known transfer protocols.

"CLIENT DEVICE" in this context refers to any machine 2100 that interfaces to a communications network 2132 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 2132.

"COMMUNICATIONS NETWORK" in this context refers to one or more portions of a network 2132 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 2132 or a portion of a network 2132 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 2110 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 2110. The term "machine-readable medium" shall also be taken to include any medium, or combination of multiple media, that is capable of storing instructions 2110 (e.g., code) for execution by a machine 2100, such that the instructions 2110, when executed by one or more processors 2104 of the machine 2100, cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process, A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 2104) may be configured by software (e.g., an application 2016 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 2104 or other programmable processor 2104. Once configured by such software, hardware components become specific machines 2100 (or specific components of a machine 2100) uniquely tailored to perform the configured functions and are no longer general-purpose processors 2104. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 2104 configured by software to become a special-purpose processor, the general-purpose processor 2104 may be configured as respectively different special-purpose processors (e.g., comprising different hardware components) at different times. Software accordingly configures a particular processor or processors 2104, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 2102) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 2104 that are temporarily configured (e.g., by software) or permanently configured to perform the relevant operations. Whether temporarily or permanently configured, such processors 2104 may constitute processor-implemented components that operate to perform one or more operations or functions described herein. As used herein, "processor-implemented component" refers to a hardware component implemented using one or more processors 2104. Similarly, the methods described herein may be at least partially processor-implemented, with a particular processor or processors 2104 being an example of hardware. For example, at least some of the operations of a method may be performed by one or more processors 2104 or processor-implemented components. Moreover, the one or more processors 2104 may also operate to support performance of the relevant operations in a "cloud computing" environment or as a "software as a service" (SaaS). For example, at least some of the operations may be performed by a group of computers (as examples of machines 2100 including processors 2104), with these operations being accessible via a network 2132 (e.g., the Internet) and via one or more appropriate interfaces (e.g., an API). The performance of certain of the operations may be distributed among the processors 2104, not only residing within a single machine 2100, but deployed across a number of machines 2000. In some example embodiments, the processors 2104 or processor-implemented components may be located in a single geographic location (e.g., within a home environment, an office environment, or a server farm). In other example embodiments, the processors 2104 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 2100. A processor 2104 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 2104 (sometimes referred to as "cores") that may execute instructions 2110 contemporaneously.

What is claimed is:

1. A computer-implemented method, comprising:
receiving from a decentralized app (dApp), a shard creation transaction in a blockchain block of a blockchain, the blockchain block comprising pre-existing shard(s), the shard creation transaction creating shard processing resources;
collecting, with a join block in the blockchain, transactions, the join block as a special blockchain block at an interval, the join block executing cross shard transactions without impacting parallel execution of intra-shard transactions with separate processing resources by separating inter-shard and intra-shard transactions into different blocks;

ceasing, by all nodes, processing any intra-shard transactions;

encapsulating the shard creation transaction;

applying the join block including the shard creation transaction to yield a new shard in the blockchain block; and broadcasting the blockchain block having the new shard.

2. The method of claim 1, further comprising
receiving a transaction from the dApp for the new shard;
executing, the transaction as input in processing resources assigned for the new shard;
encapsulating the executed dApp transaction into the new shard in the blockchain block;
verifying the executed dApp transaction; and
applying the blockchain block after verification.

3. The method of claim 2, further comprising
receiving a connect transaction from the dApp, the transaction comprising a destination and source; and
connecting a destination and source shard.

4. The method of claim 1, wherein the multiple shards have their own permissions.

5. The method of claim 1, wherein only transactions created by the dApp for a specific shard are added to the specific shard.

6. The method of claim 5, further comprising executing the transactions for different shards in parallel by different processing resources.

7. The method of claim 6, further comprising configuring different processing resources to share a same memory space of node processing resources.

8. The method of claim 7, further comprising configuring the different processing resources to run in different hardware threads and CPU cores of a computer server.

9. The method of claim 8, further comprising joining together software threads to execute a join block transaction.

10. The method of claim 1, further comprising ceasing shard execution when a join block is executing.

11. The method of claim 1, further comprising communicating between sibling chains via the join block.

12. The method of claim 1, further comprising sharding a block on the same node via multithreading.

13. The method of claim 1, further comprising forking an existing chain and preserving a state of the existing chain in a new chain.

14. A system, comprising:
one or more processors of a machine;
a non-transitory memory storing instruction that, when executed by the one or more processors, cause the machine to perform operations comprising:
receiving from a distributed app (dApp), a shard creation transaction in a blockchain block of a blockchain, the blockchain block comprising pre-existing shard(s), the shard creation transaction creating shard processing resources;
collecting, with a join block in the blockchain, transactions, the join block adjacent the blockchain block, the join block executing cross shard transactions without impacting parallel execution of intra-shard transactions with separate processing resources by separating inter-shard and intra-shard transactions into different blocks;
ceasing, by all nodes, processing any intra-shard transactions;
encapsulating the shard creation transaction;
applying the join block including the shard creation transaction to yield a new shard in the blockchain block; and
broadcasting the blockchain block having the new block.

15. A non-transitory machine-readable medium embodying instructions that, when executed by a machine, cause the machine to perform operations comprising:
receiving from a distributed app (dApp), a shard creation transaction in a blockchain block of a blockchain, the blockchain block comprising pre-existing shard(s), the shard creation transaction creating shard processing resources;
collecting, with a join block in the blockchain, transactions, the join block adjacent the blockchain block, the join block executing cross shard transactions without impacting parallel execution of intra-shard transactions with separate processing resources by separating inter-shard and intra-shard transactions into different blocks;
ceasing, by all nodes, processing any intra-shard transactions;
encapsulating the shard creation transaction;
applying the join block including the shard creation transaction to yield a new shard in the blockchain block; and
broadcasting the blockchain block having the new block.

16. The medium of claim 15, wherein the operations further comprise
receiving a transaction from the dApp for the new shard;
executing the transaction as input;
encapsulating the executed dApp transaction into the new shard in the blockchain block;
verifying the executed dApp transaction; and
applying the blockchain block after verification.

17. The medium of claim 15, wherein the operations further comprise
receiving a connect transaction from the dApp, the transaction comprising a destination and source; and
connecting a destination and source shard.

18. The medium of claim 15, wherein the multiple shards have their own permissions.

19. The medium of claim 15, wherein only transactions created by the dApp for a specific shard are added to the specific shard.

20. The medium of claim 19, wherein the operations further comprise executing the transactions for different shards in parallel by different processing resources.

21. The medium of claim 20, wherein the operations further comprise configuring the different processing resources to share a same memory space of a node processing resources.

22. The medium of claim 21, wherein the operations further comprise configuring the different processing resources to run in different hardware threads and CPU cores of a computer server.

23. The medium of claim 22, wherein the operations further comprise joining together software threads to execute a join block transaction.

24. The medium of claim 15, wherein the operations further comprise ceasing shard execution when a join block is executing.

25. The medium of claim 15, wherein the operations further comprise communicating between sibling chains via the join block.

26. The medium of claim 15, wherein the operations further comprise sharding a block on the same node via multithreading.

27. The medium of claim 15, wherein the operations further comprise forking an existing chain and preserving a state of the existing chain in a new chain.

\* \* \* \* \*